US008379232B2

(12) United States Patent
Hasegawa et al.

(10) Patent No.: US 8,379,232 B2
(45) Date of Patent: Feb. 19, 2013

(54) IMAGE PROCESSING DEVICE, IMAGE PROCESSING METHOD, AND IMAGE PROCESSING PROGRAM

(75) Inventors: Junko Hasegawa, Abiko (JP); Teruyuki Takata, Ueda (JP); Takashi Koase, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 985 days.

(21) Appl. No.: 12/408,967

(22) Filed: Mar. 23, 2009

(65) Prior Publication Data

US 2009/0244634 A1 Oct. 1, 2009

(30) Foreign Application Priority Data

Mar. 26, 2008 (JP) ................................ 2008-079949
Oct. 6, 2008 (JP) ................................ 2008-259334

(51) Int. Cl.
*H04N 1/40* (2006.01)

(52) U.S. Cl. ........ 358/1.1; 358/1.9; 358/3.21; 358/3.23; 399/405; 399/406; 347/9; 347/102

(58) Field of Classification Search ................... 358/1.1, 358/1.9, 3.21, 3.23; 399/405, 406; 347/9, 347/102
See application file for complete search history.

(56) References Cited

U.S. PATENT DOCUMENTS

| | | | | |
|---|---|---|---|---|
| 6,375,318 | B1 * | 4/2002 | Johnson | 347/102 |
| 7,564,591 | B1 * | 7/2009 | Takahashi et al. | 358/3.21 |
| 8,007,100 | B2 * | 8/2011 | Ishihara et al. | 347/104 |
| 2001/0014370 | A1 * | 8/2001 | Graczyk | 427/209 |
| 2003/0137572 | A1 * | 7/2003 | Miyamoto et al. | 347/102 |
| 2005/0157131 | A1 * | 7/2005 | Iinuma | 347/100 |
| 2008/0055347 | A1 * | 3/2008 | Ino et al. | 347/9 |
| 2008/0219734 | A1 * | 9/2008 | Seto | 399/406 |

FOREIGN PATENT DOCUMENTS

| | | |
|---|---|---|
| JP | 2001-274964 | 10/2001 |
| JP | 2005-111707 | 4/2005 |
| JP | 2005-212183 | 8/2005 |
| JP | 2007-058768 | 3/2007 |

* cited by examiner

*Primary Examiner* — King Poon
*Assistant Examiner* — Allen H Nguyen
(74) *Attorney, Agent, or Firm* — DLA Piper LLP (US)

(57) ABSTRACT

An image processing device includes a memory portion for storing an ejection amount conversion table showing a relationship between image data serving as reference and a fluid ejected from a fluid ejecting head for a predetermined number of pixels, and an ejection amount estimation unit which estimates an ejection amount of the fluid from input image data on the basis of the ejection amount conversion table stored in the memory portion.

7 Claims, 23 Drawing Sheets

IMAGE PROCESSING DEVICE, IMAGE PROCESSING METHOD, AND IMAGE PROCESSING PROGRAM

BACKGROUND

1. Technical Field

The present invention relates to an image processing device, an image processing method, and an image processing program.

2. Related Art

As one of ink jet type printers, there is a line head printer equipped with a print head which is called a line head and does not move. The line head printer can considerably improve the print speed. In the line head printer, a print paper curl occurs because a new ink droplet is placed on the print paper before a previously placed ink droplet dries to improve the print speed. In order to suppress the paper curl, a method of reducing an ink hit amount at a position where it is anticipated that the amount of ink placed on the print paper (ink hit amount) is larger than a predetermined amount may be adopted. However, such a method requires estimating the ink hit amount before ink is discharged by driving the line head.

However, the ink hit amount is obtained on the base of on/off information and the weight of ink of a dot for a pixel after producing the final output image data. JP-A-2007-58768 discloses a technique of grasping ink consumption before printing is performed by a user.

According to JP-A-2007-58768, it is possible to recognize normal ink consumption in which the contents of document are not considered before printing. However, the technique disclosed in JP-A-2007-58768 relates only to the normal ink consumption. Accordingly, in the case of trying to reduce the ink hit amount in order to suppress the curl, it is impossible to perform such reduction of the ink hit amount as long as actual ink hit amount is not grasped. Further, in the line head printer, since the print speed is very high, data processing as well as reduction of the ink hit amount must be performed at high speed.

SUMMARY

It is an object of some aspects of the invention to provide an image processing device, an image processing method, and an image processing program which can precisely estimate an ejection amount of a fluid and improve estimation speed of the ejection amount.

According to one aspect of the invention, there is provided an image processing device including a memory portion which stores an ejection amount conversion table showing a relationship between image data serving as reference and a fluid ejected from a fluid ejecting head for a predetermined number of pixels, and an ejection amount estimation unit which estimates an ejection amount of a fluid from input image data on the basis of the ejection amount conversion table stored in the memory portion.

With such a structure, in the ejection amount estimation unit, the ejection amount of the fluid is estimated on the basis of the ejection amount conversion table. Accordingly, it is possible to estimate the fluid ejection amount with high precision without performing color conversion processing, half tone processing, and rasterizing processing with respect to the image data. Therefore, in a line head printer, whether print medium curl occurs can be estimate from the fluid ejection amount. When it is anticipated that such a curl occurs, it is possible to perform reduction of the ejection amount of the fluid. Further, since it is possible to estimate the fluid ejection amount without performing the color conversion processing, the half tone processing, and the rasterizing processing with respect to the image data, it is possible to improve the estimation speed.

In the image processing device, it is preferable that the ejection amount conversion table is created on the basis of patch image data expressed by an RGB color system and having predetermined data amount, the ejection amount conversion table has data for a single pixel in the patch image data, and the data of the single pixel has an anticipated value relating to ejection of the fluid.

With such a structure, the ejection amount conversion table has the anticipated value relating to the ejection of the fluid for a single pixel from the patch image. Accordingly, in the ejection amount estimation unit, it is possible to easily estimate the ejection amount of the fluid by integrating the anticipated values for every pixel of the input image data.

In the image processing device, it is preferable that the ejection amount estimation unit has a gradation reduction processing portion which performs processing of reducing a gradation number of the input image data.

With such a structure, it is possible to reduce the gradation number of the input image data by the gradation reduction processing portion. Thus, it becomes possible to estimate the ejection amount of the fluid in a state of having a smaller data amount than the input image, and therefore it is possible to improve the estimation speed.

In the image processing device, it is preferable that the input image data is expressed by a 256-level gradation and by the RGB color system, and the ejection amount conversion table has a pixel value expressed by the RGB color system and a smaller gradation number than the data of 256-level gradation, and an anticipated value with respect to the pixel value.

With such a structure, since the ejection amount conversion table has the pixel value in the case in which the data is expressed by a reduced gradation number and the anticipated value with respect to the pixel value, it is possible to considerably reduce the data amount of the ejection amount conversion table compared to the case in which pixels values of 256 levels of gradation, respectively are matched with the anticipated values. With such a method, it is possible to greatly improve the fluid ejection amount estimation processing speed.

In the image processing device, it is preferable that a gradation difference in the 256-level gradation before the gradation reduction is smaller at an area provided with a relatively large ejection amount of the fluid than at an area provided with a relatively small ejection amount of the fluid when the pixel value is expressed by a value of the 256-level gradation before reduction.

With such a structure, the gradation difference in the 256-level gradation is smaller at an area with a large amount of the fluid, i.e. a shadow area, than at an area with a small amount of the fluid, i.e. a highlight area. Accordingly, it is possible to precisely know the change of the ejection amount at a portion at which the change of the ejection amount of the fluid is large, and to finely set the reduction of the ejection amount of the fluid in the case in which occurrence of the paper curl is anticipated.

In the image processing device, it is preferable that the ejection amount estimation unit has a resolution reduction processing portion which performs processing of reducing a number of pixels of the input image data and the resolution reduction processing portion can reduce the number of pixels by extracting a gradation value of one pixel of a pixel group existing in a predetermined range as a representative pixel value.

With such a structure, since it is possible to reduce the number of pixels by extracting the gradation value of one pixel of a pixel group existing in a predetermined range as a representative pixel value, it is possible to more considerably improve the processing speed of the fluid ejection amount estimation.

In the image processing device, it is preferable that the ejection amount estimation unit has a resolution reduction processing portion which performs processing of reducing a number of pixels of input image data, and the resolution reduction processing unit can reduce the number of pixels by calculating a representative pixel value for representing a pixel group existing within a predetermined range, the representative pixel value being a gradation value of one pixel, using a predetermined conversion equation.

With such a structure, in order to represent the pixel group existing within the predetermined range with a gradation value of one pixel, the representative pixel value is calculated on the basis of the predetermined conversion equation. With such a method, it is possible to reduce the number of pixels and more considerably improve the estimation processing speed of the fluid ejection amount.

In the image processing device, it is preferable that the ejection amount ejection unit estimates the ejection amount of the fluid for an area specified on a medium to which the fluid is ejected, and the image processing device has a curl state prediction unit which predicts occurrence of medium curl attributable to ejection of the fluid to the medium on the basis of a position of the area on the medium and the ejection amount of the fluid ejected to the area.

With such a structure, it is possible to precisely predict the medium curl state since the curl state is different according to the position on the medium to which the fluid is ejected.

In the image processing device, it is preferable that the curl state prediction unit converts a force of causing the medium to curl in a predetermined direction and a force of causing the medium to curl in a direction intersecting the predetermined direction so as to be different from each other when converting the ejection amount of the fluid for each of area to a force of causing the medium to curl, and predicts a curl amount of the area for every area on the basis of the force of causing the medium to curl.

With such a structure, it is possible to more precisely predict the curl state of the medium.

According to another aspect of the invention, there is provided an image processing method including a table creation step of creating an ejection amount conversion table showing a relationship between image data serving as reference and a fluid ejected from a fluid ejecting head for a predetermined number of pixels, and an ejection amount estimation step of estimating a fluid ejection amount from input image data on the basis of the ejection amount conversion table.

With such a structure, it is possible to estimate the ejection amount of the fluid with high precision on the basis of the ejection amount conversion table. Accordingly, it is possible to estimate the ejection amount of the fluid without performing color conversion processing, half tone processing, and rasterizing processing with respect to the image data. For such a reason, since it is possible to estimate the ejection amount of the fluid without performing the color conversion processing, the half tone processing, and the rasterizing processing with respect to the image data, it is possible to improve the estimation speed. Accordingly, in the line head printer, it becomes possible to estimate whether the print medium curl occurs from the ejection amount of the fluid. Thus, it is possible to reduce the ejection amount of the fluid when the curl occurrence is anticipated.

According to a further aspect of the invention, there is provided an image processing program which executes a table creation procedure of creating an ejection amount conversion table showing a relationship between image data serving as reference and a fluid ejected from a fluid ejecting head for a predetermined number of pixels and an ejection amount estimation procedure of estimating a fluid ejection amount from the input image data on the basis of the ejection amount conversion table.

With such a program, it is possible to precisely estimate the ejection amount of the fluid on the basis of the ejection amount conversion table. Accordingly, it is possible to estimate the ejection amount of the fluid with respect to the image data without performing color conversion processing, half tone processing, or rasterizing processing. For such a reason, in the line head printer, it becomes possible to estimate whether the print medium curl occurs from the fluid ejection amount, and therefore it is possible to reduce the ejection amount when the curl occurrence is anticipated. Further, it is possible to make the estimation processing faster since it is possible to estimate the ejection amount of the fluid without performing the color conversion processing, the half tone processing, and the rasterizing processing with respect to the image data.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a printing device 10 equipped with an image processing device according to one embodiment of the invention will be described with reference to FIGS. 1 to 6. The printing device 10 means a combination of a computer 20 and an ink jet printer 30. However, a printer having all the functions which will be described below may be regarded as the printing device 10. Further, the image processing device is a device existing between the computer 20 and the printer 30. However, in the following description, FIG. 2 functionally executed in the computer 20 corresponds to the image processing device.

Overall Structure of Printing Device

Figure 1:
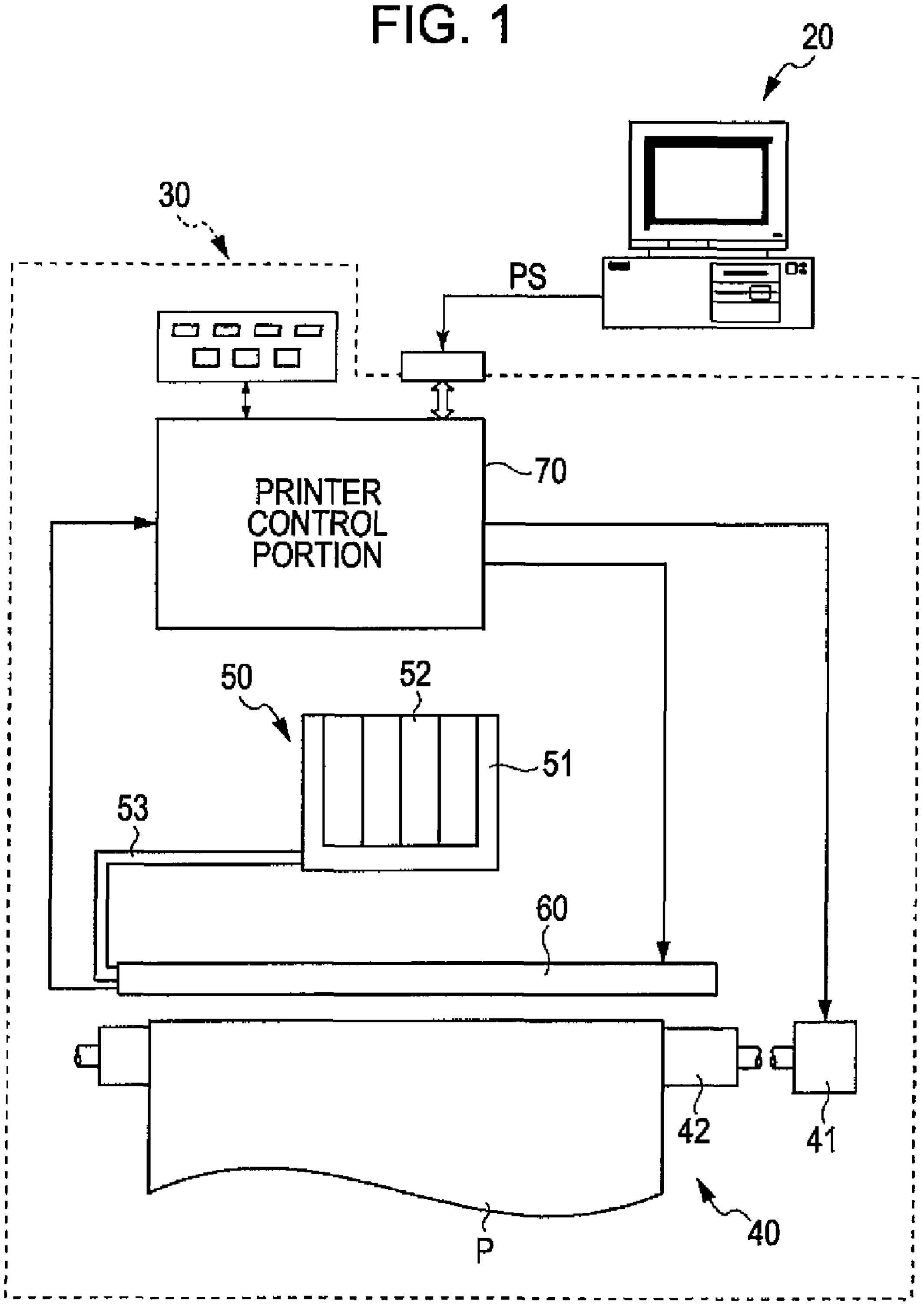
FIG. 1 is an overall view illustrating structures of a printing device and a printer.

FIG. 1 shows an overall structure of the printing device 10. As shown in FIG. 1, the printing device 10 includes the computer 20 and the printer 30.

Figure 2:
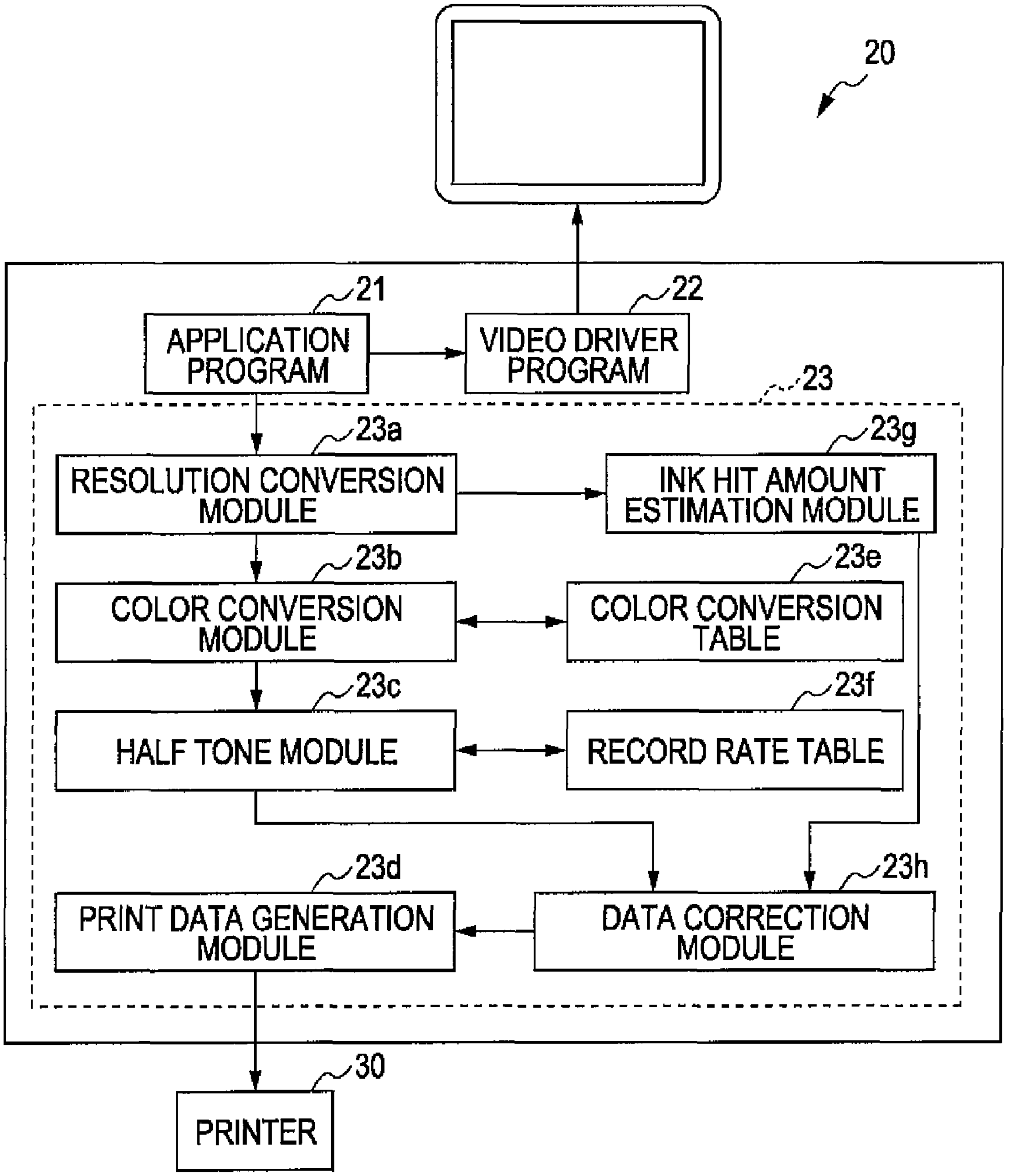
FIG. 2 is a view illustrating an example of a program stored in a computer.

The computer 20 includes a central processing unit (CPU) (not shown), a memory, a hard disk drive (HDD), an interface unit, a bus, and an image processing circuit, such as an accelerator board, and functions of programs and drivers shown in FIG. 2 are realized by the computer 20. The computer 20 is equipped with application programs 21, a video driver program 22, and a printer driver program 23. These programs operate under a predetermined operating system (OS). A memory portion in claims corresponds to the HDD but may correspond to the memory.

The application programs 21 are, for example, image processing programs. The application programs 21 process an image taken in from a digital camera, etc., or process an image drawn by a user, and then output the processed image to the video driver program 22 and the printer driver program 23. The video driver program 22 performs, for example, gamma processing or white balance adjustment with respect to image data (corresponding to input image data in claims) supplied from the application programs 21, and then generates a video signal. After that, the video driver program 22 supplies the video signal to a display device connected to the computer 20 so as to be displayed.

The printer driver program 23, particularly ink hit amount estimation module 23*g*, corresponds to an ejection amount estimation unit in claims. The printer driver program 23 includes a resolution conversion module 23*a*, a color conversion module 23*b*, a half tone module 23*c*, a print data generation module 23*d*, a color conversion table 23*e*, a record rate table 23*f*, the ink hit amount estimation module 23*g*, and a data correction module 23*h*.

Of these modules, the resolution conversion module 23*a* is a module of converting a resolution of the image data of the RGB color system to an appropriate resolution according to a print resolution of the printer 30. The color conversion module 23*b* performs processing of converting the image data expressed by the red, green, and blue (RGB) color system to image data (hereinafter, referred to as intermediate data) expressed by a cyan, magenta, yellow, and black (CMYK) system) with reference to the color conversion table 23*e*.

The half tone module 23*c* converts the image data expressed by the CMYK color system to bit map data composed of dots of two values or multiple values (for example, large, middle, and small) with reference to a dithered matrix (not shown) and the record rate table 23*f*. The print data generation module 23*d* generates print data including raster data showing a record state of dots at each of main scans and data showing a sub-scan sending amount from the corrected bit map data output from the data correction module 23*h* which will be described below and then supplies the print data to the printer 30.

The data correction module 23*h* performs correction of the ink hit amount with respect to bit map data which have undergone the half tone processing on the basis of ink hit amount estimated by the ink hit amount estimation module 23*g*. Further, the ink hit amount correction means processing of reducing a hit amount of an ink which corresponds to a fluid in claims so that the ink hit amount does not exceed an ink hit amount threshold value since a curl of a print medium P occurs in the case in which the ink hit amount exceeds the predetermined ink hit amount threshold value.

Regarding Ink Hit Amount Estimation Module

Figure 3:
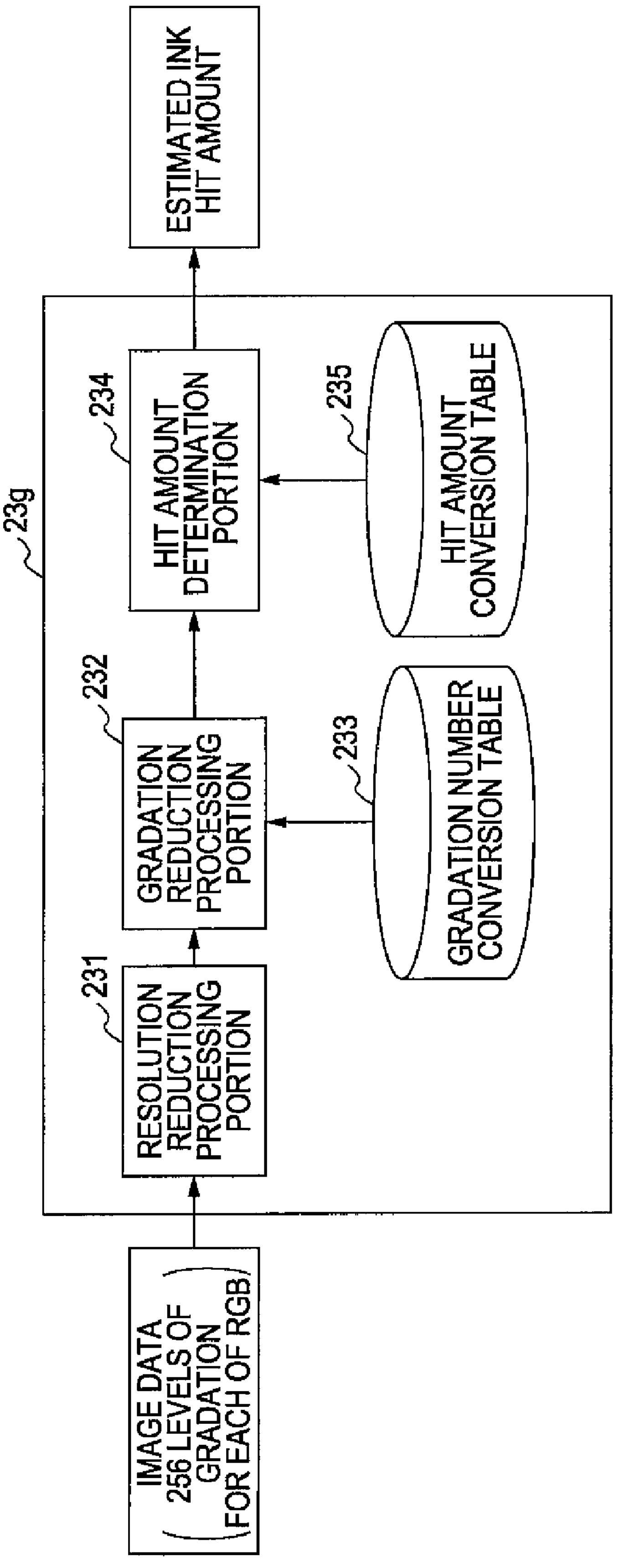
FIG. 3 is a block diagram for explaining an ink hit amount estimation module.

FIG. 3 is a block diagram for explaining a structure of the ink hit amount estimation module 23*g*. The ink hit amount estimation module 23*g* performs estimation of the ink hit amount using the image data of the RGB color system which has undergone the resolution conversion processing i.e. the image data which has undergone size adjustment according to a size of the print medium P in the printer 30 and resolution conversion processing according to a specified print mode.

The ink hit amount estimation module 23*g* includes a resolution reduction processing portion 231, a gradation reduction processing portion 232, a gradation number conversion table 233, a hit amount determination portion 234, and a hit amount conversion table 235.

Of these elements of the ink hit amount estimation module 23*g*, the resolution reduction processing portion 231 reduces a data amount by lowering a resolution of image data of the RGB color system. Accordingly, a number of pixels constituting the image data are reduced. In most cases, gradation values of pixels existing around a specific pixel are almost equal to a gradation value of the specific pixel. For such a reason, in the reduction of the resolution, for example, processing for representing gradation values of m×n pixels with a gradation value of one pixel is performed. That is, processing of determining a representative pixel value is performed. As an exemplary method of determining the representative pixel value, there is a method in which a gradation value of a certain pixel is randomly selected from m×n pixels or a gradation value of a pixel at a predetermined position is regarded as the representative pixel value. However, alternatively the representative pixel value may be obtained by other methods (for example, a linear approximation method and a three-dimensional convolution method in which the average value of the gradation values of entire pixels in an m×n area is used as the representative pixel value).

The gradation reduction processing portion 232 tries to reduce the data mount by reducing a gradation number of the image data. For example, the image data which has passed through the resolution reduction processing 231 has 256 levels of gradation per color of RGB, but these are reduced to predetermined levels of gradation (gradation numbers) In the reduction of the gradation numbers, the gradation number conversion table 233 is used. Besides the gradation number conversion table 233, a division process for the gradation number of 256-level gradation is executed, a predetermined conversion equation is used, or a combination thereof is performed to reduce the gradation number. Examples of the conversion equation include the linear approximation method and the three-dimensional convolution method.

Figure 4:
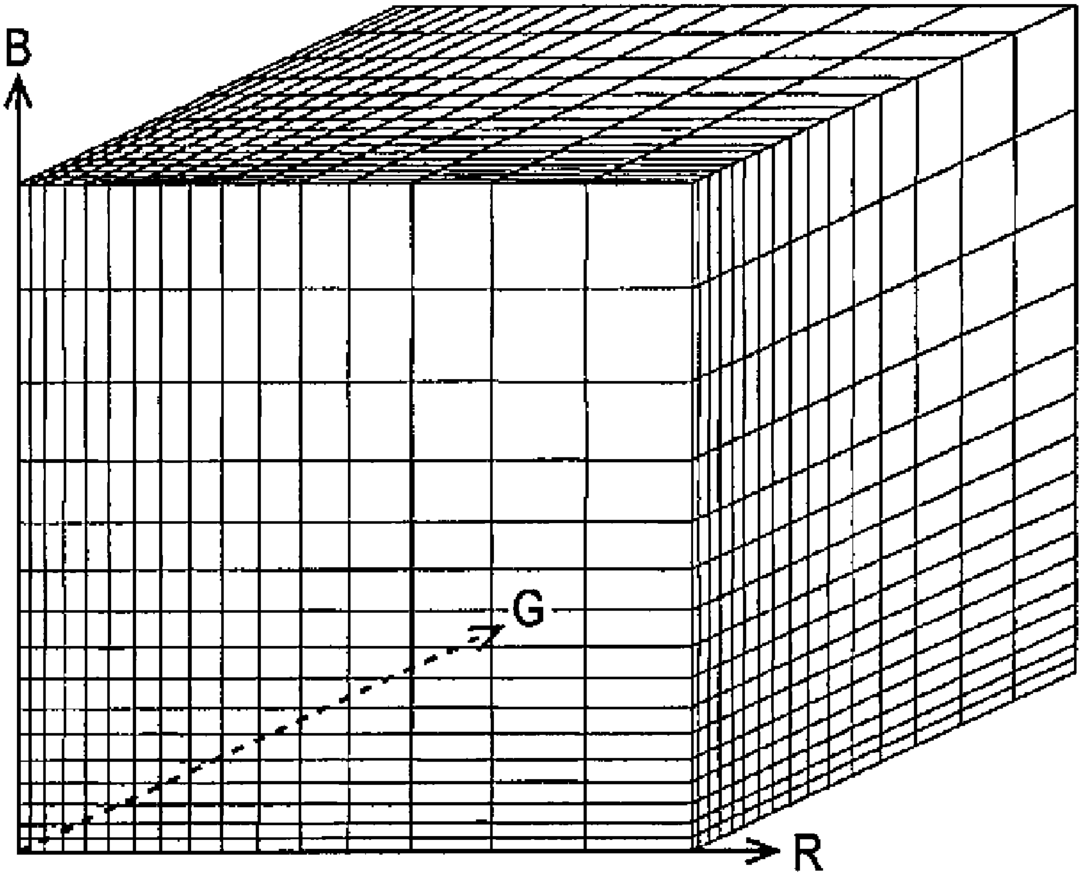
FIG. 4 is a view illustrating a three-dimensional image of an ink hit amount conversion table.

The gradation number conversion table 233 reduces the gradation number by using a conversion table created based on grid position information (with reference to FIG. 4) of a hit amount conversion table 235, and performs processing of harmonizing the gradation number with the gradation number of the hit amount conversion table 235 which will be described below. The gradation number may be any value if the gradation number is a value harmonizing with the gradation number of the hit amount conversion table 235. In FIG. 4, the hit amount conversion table 235 shows an example in which the gradation is reduced to 17 levels. Accordingly, the reduction of the gradation number is accomplished by using the grid position information of the hit amount conversion table 235 of FIG. 4. As for data of gradation included in each grid point, the gradation data is higher or lower than the grid point value, i.e. the gradation data may be the value higher or lower than the grid point.

The hit amount determination portion 234 estimates the ink hit amount with respect to the image data which has passed through the gradation reduction processing portion 232 with reference to the hit amount conversion table 235. At this time, the hit amount determination portion 234 estimates the ink hit amount for m×n areas before the resolution reduction by multiplying the ink hit amount per pixel referenced in the hit amount conversion table 235 (corresponding to ejection amount conversion table in claims) by m×n. In the hit amount conversion table 235, 17×17×17 grid points shown in FIG. 4 are matched with the ink hit amounts, respectively. Here, each of the ink hit amounts matched with the grid points is the anticipated value (stochastic anticipated value) relating to the ink hit per pixel.

In the hit amount conversion table 235 shown in FIG. 4, at a place where the ink hit amount is small (i.e. the gradation value is nearly 255), a grid interval is rough. Conversely, at a place where the ink hit amount is large (the gradation value is nearly 0), the grid interval is minute. In other words, at a place where the change of the ink hit amount is severe, the grid interval is minute so that the change of the hit amount can be easily notified. On the other hand, at a place where the change of the ink hit amount is subtle, the grid interval is rough because the change of the hit amount is almost no.

Schematic Structure of Printer

Next, the schematic structure of the printer 30 will be described. FIG. 1 shows the schematic structure of the printing device 10 and the structure of the printer 30. The printer 30 includes a paper sending mechanism 40, an ink supply mechanism 50, a line head 60, and a printer control portion 70.

The paper sending mechanism 40 includes a paper sending motor (PF motor) 41, and a paper supply roller 42 to which driving power is transferred from the paper sending motor 41, so that print medium P, such as print paper, can be transported toward a paper discharge side from a paper supply portion. The ink supply mechanism 50 includes a cartridge holder 51, an ink cartridge 52, and an ink supply path 53. The ink cartridge 52 is mounted in the cartridge holder 51 in a freely detachable manner. Accordingly, the printer 30 of this embodiment has a so-called off carriage type structure. The ink supply path 53 is provided between the ink cartridge 52 and the line head 60, and therefore ink (corresponding to fluid) can be supplied to the line head 60 from the ink cartridge 52.

The line head 60 corresponds to a fluid ejection head referred in claims but the line head 60 has a width larger than that of the print medium P. There are two types of line head 60. One type is a line head, a body of which is integrally formed. The other type is a line head composed of a plurality of short heads arranged in a sub-scanning direction, in the vicinities in the main-scanning direction.

The printer control portion 70 includes a central processing unit (CPU) (not shown), a memory (for example, read only memory (ROM), random access memory (RAM), nonvolatile memory, or application specific integrated circuit (ASIC)), a bus, a timer, and an interface unit. The printer control portion 70 is supplied with print data and signals from various sensors, and drives motors, such as paper sensing motor 41, and the line head 60 on the basis of the signals from the sensors.

The printer control portion 70 is connected to the computer 20 via a connector (not shown), and thus performs communication with the computer 20. Accordingly, if the printer 30 receives print data from the computer 20 processing for printing is started in the printer 30 on the basis of the print data.

Regarding Production of a Hit Amount Conversion Table

Figure 5:
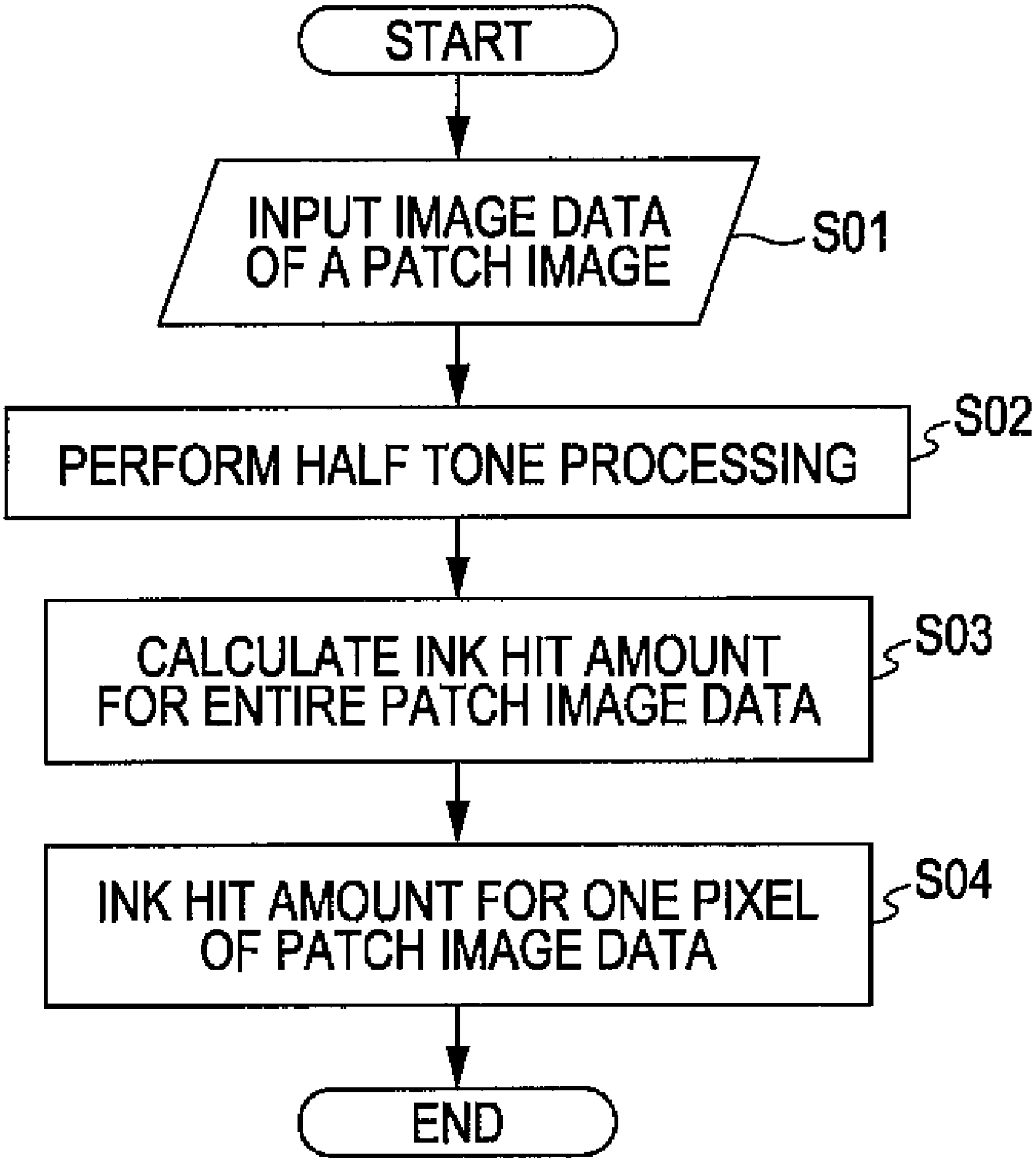
FIG. 5 is a processing flow for explaining production of an ink hit amount conversion table.

Next, in the printing device 10 having the above structure, creation of the hit amount conversion table 235 will be described below with reference to processing flow of FIG. 5. The processing flow is executed in a predetermined image processing device before the hit amount conversion table 235 is mounted in the printer 30. The image processing device has portions corresponding to an image input portion, a half tone processing portion, and a print data generation portion.

First, image data of a patch image (color sample) (patch image data) for obtaining an ink hit amount is supplied, but the image data corresponds to each of grid points. Further, as described above, in order to obtain the ink hit amount by an anticipated value for one pixel, the patch image data must have a plural number of pixels which is larger than a certain number. Accordingly, the patch image data has a plural number of pixels, for example 100×100 pixels. When the patch image data of the RGB color system is input (S01), the color conversion processing is performed with respect to the patch image data to convert the RGB system data to the CMYK data (illustration is omitted), and then the half tone processing is performed (S02). With these processing, the patch image data is expressed by on/off of each of dots in the CMYK color system. In the case in which it is possible to sort large and small dots, such information is also considered. Alternatively, the data may be converted to data of a CMY color system or data of a color system including neutral colors of CMY other than the CMYK color system data, which is the same in the printer driver program 23.

After the half tone processing, the ink hit amount for each of the patch image data is calculated on the basis of the image data after the half tone processing (S030). The ink hit amount is obtained for each of color inks C, M, Y, and K. With such processing, the ink hit amounts with respect to the input patch image data are obtained.

After processing of Step S03, the ink hit amount for each of pixels of the patch image data is calculate (S040). Here, the actual ink jet means jetting a droplet of a specified color of ink or un-jetting a droplet of the specified color of ink with respect to a certain pixel. However, the ink hit amount for a single pixel which is obtained is an averaged value i.e. an anticipated value. If all the pixels of the patch image data are added, the sum becomes equal to the ink hit amount obtained in Step S03.

Such processing is repeated with respect to each of 17×17×17 grid points. Thus, the ink hit amount for each of pixels is obtained with respect to entire grid points. The ink hit amounts obtained for every pixel are stored as the ink hit amount conversion table 235.

Regarding Processing Flow When Printing

Figure 6:
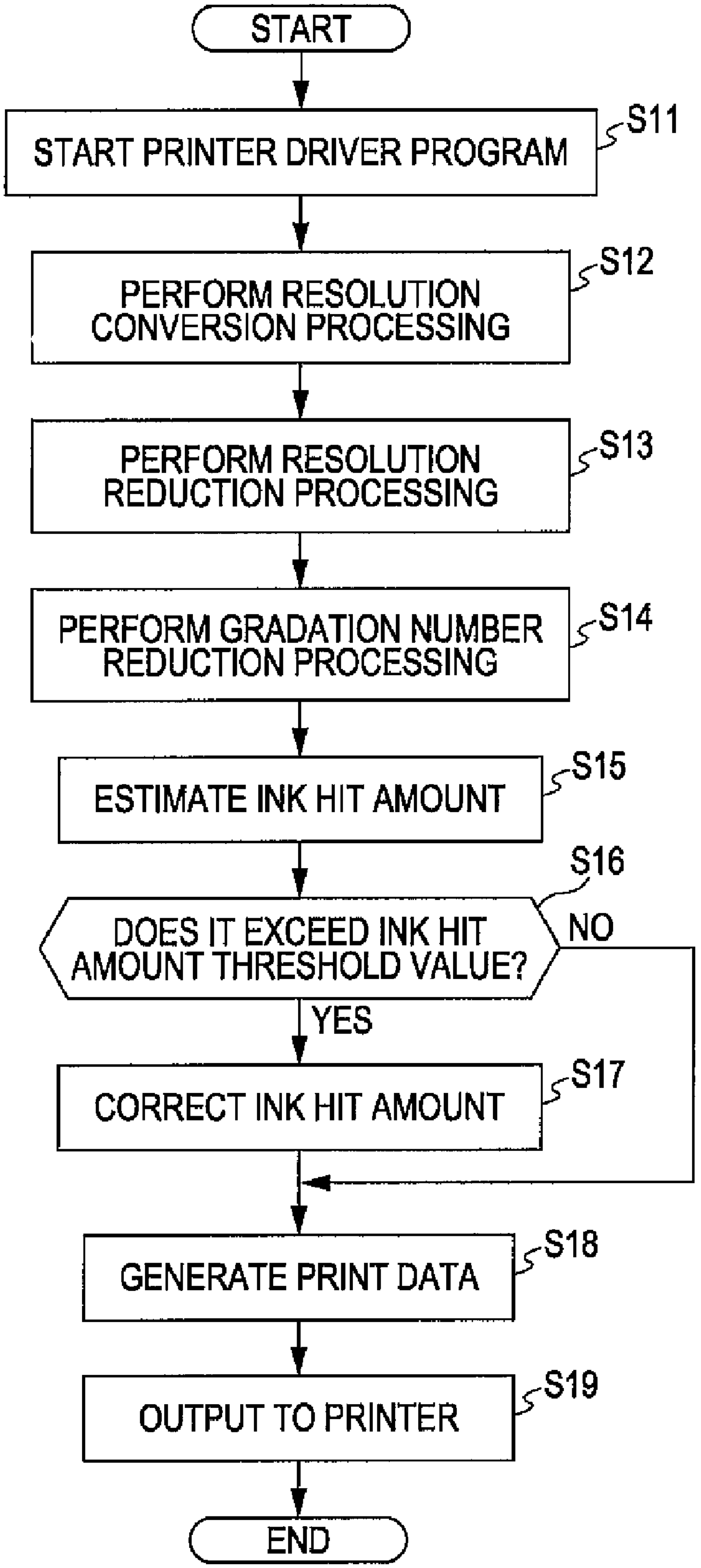
FIG. 6 is a processing flow for explaining processing from ink hit amount estimation to printing.

Next, the entire processing flow will be described with reference to FIG. 6. Before printing, a user drives the application program 21 so that desired image data is displayed. After that, if the user selects a predetermined print mode, for example, for performing high definition printing, and then instructs the printer to print out, the printer driver program 23 is driven on the basis of the print instruction (S11). If the print driver program 23 is driven, the resolution conversion processing which harmonizes the image data with the print resolution of the printer 30 is performed by the resolution conversion module 23*a* (S12).

Accordingly, the ink hit amount estimation module 23*g* is driven and thus estimation of the ink hit amount is performed using the image data which has undergone the resolution conversion processing. In greater detail, processing of further lowering the resolution (determination of a representative pixel value) is performed with respect to the image data which has undergone the resolution conversion processing once by the resolution reduction processing portion 231. As a result, a primary data amount reduction is achieved (S13). After the primary data amount reduction, processing of reducing a gradation number is performed with reference to the gradation number conversion table in the gradation reduction processing portion 232, and thus a secondary data amount reduction is achieved (S14). In the reduction of the gradation number, processing of converting the image data of 256-level gradation for each of RGB to data of 17-level gradation for each of RGB is performed.

Next, in the hit amount determination portion 234, estimation of the ink hit amount is performed using the image data which has undergone the gradation number reduction with reference to the hit amount conversion table 235 (S15). As described above, the hit amount conversion table 235 has the anticipated value for each of sections of grid as the ink hit amount. Here, in the hit amount determination portion 234, the ink hit amount of a pixel group within a range represented by the representative pixel value is obtained by multiplying the ink hit amount serving as the anticipated value by m×n times. The estimation of the ink hit amount with respect to the image data is achieved by performing the above processing to the pixels of the entire image data.

Next, the data correction module 23*h* judges whether the obtained ink hit amount exceeds an ink hit amount threshold value with reference to the ink hit amount estimated in the ink hit amount estimation module 23*g* (S16). In the case in which it is judged such that the obtained ink hit amount exceeds the ink hit amount threshold value (case of YES), the data correction module 23*h* performs correction of the ink hit amount (S17). In the correction of the ink hit amount, since a curl of the print medium P occurs in the case in which the obtained ink hit amount exceeds a predetermined ink hit amount threshold value, the ink hit amount is corrected to an amount by which the curl does not occur by performing correction processing, such as reduction of the ink hit amount.

With respect to the image data which has undergone the resolution conversion processing of Step S12, the color conversion processing for converting the data to the image data of the CMYK color system is performed by the color conversion module 23*b*, and the half tone processing which expresses the dots with on/off is performed by the half tone module 23*c* (not shown). Further, the correction processing of the ink hit amount of Step S17 is performed with respect to the image data which has undergone the half tone processing. However, alternatively the correction processing may be performed after the final print data is generated by the print data generation module 23*d*. In the reduction of the ink hit amount, such correction processing is performed with respect to the entire image data which has undergone the half tone processing or part of the image data.

After that, in the print data generation module 23*d*, the print data is generated from the after-correction bit map data output from the data correction module 23*h* (S18). Thus, the generated print data is supplied to the printer 30 (S19).

Advantageous Effects Of The Invention

In the above-mentioned printing device 10, it is possible to estimate the ink hit amount with high precision with respect to the image data delivered from the application program 21 without performing the color conversion processing, the half tone processing, and the rasterizing processing. With such a method, it is possible to predict whether the curl of the print medium P occurs on the basis of the ink hit amount and the image data actually delivered from the application program 21. Accordingly, in the case in which it is anticipated that the print medium curl occurs, it is possible to reduce the ink hit amount. Further, since it is possible to estimate the ink hit amount without performing the color conversion processing, the half tone processing, and the rasterizing processing with respect to the image data, it is possible to improve the speed of the estimation processing.

The hit amount conversion table 235 has the anticipated value relating to the ink hit amount for one pixel of the patch image. Accordingly, it is possible to easily estimate the ink hit amount by integrating the anticipated values of the pixels of the image data.

Further, it is possible to achieve reduction of the gradation number of the input image data by the gradation reduction processing portion 232. In this manner, it is possible to improve the speed of the estimation processing because it is possible to estimate the ink hit amount in the state in which the data amount becomes smaller than that of the input image.

Since the hit amount conversion table 235 has the pixel values (grid) expressed by the reduced gradation numbers (17×17×17) and the anticipated values of the pixel values, it is possible to considerably reduce the data amount of the hit amount conversion table 235 compared to the case in which pixel values of every 256 gradation level are matched with the anticipated values. In this manner, it is possible to more accelerate the estimation processing of the ink hit amount.

As shown in FIG. 4, the gradation reduction processing portion 232 reduces the gradation number such that the gradation difference in the 256-level gradation becomes smaller at an area with a relatively large ink hit amount, i.e. shadow area than at an area with a relatively small ink hit amount, i.e. highlight area. For such a reason, at a position where the change of the ink hit amount is severe, it is easy to finely detect a progress of the change of the ink hit amount, and it is possible to finely set the reduction of the ink hit amount in the case in which occurrence of the curl of the print medium P is anticipated.

The resolution reduction processing portion 231 determines the representative pixel value on the basis of the gradation values of pixels of m×n pixel groups. In this manner, the reduction of the pixel number is realized, and thus it becomes possible to more highly accelerate the estimation processing of the ink hit amount. The data correction module 23*h* performs processing of reducing the hit amount at high speed from the image data which has undergone the half tone processing and the estimation result from the ink hit amount estimation module 23*g* in the case in which the hit amount of the ink exceeds the ink hit amount threshold value. Accordingly, in the case of changing the hit amount of the ink, it is possible to improve the processing speed without needing to perform processing of the half tone processing again.

Other Methods of Determining Curl Occurrence

In the print processing flow (FIG. 6), in the case in which it is judged such that the obtained ink hit amount exceeds the ink hit amount threshold value (S16: YES), the data correction module 23*h* predicts such that the curl of the print medium P occurs, so it performs correction of the ink hit amount (S17). The judgment is not limited thereto, but alternatively the judgment whether the curl of the print medium P occurs may be attained by other methods. Other methods of judging whether the curl occurs will be described below.

Figure 7A:
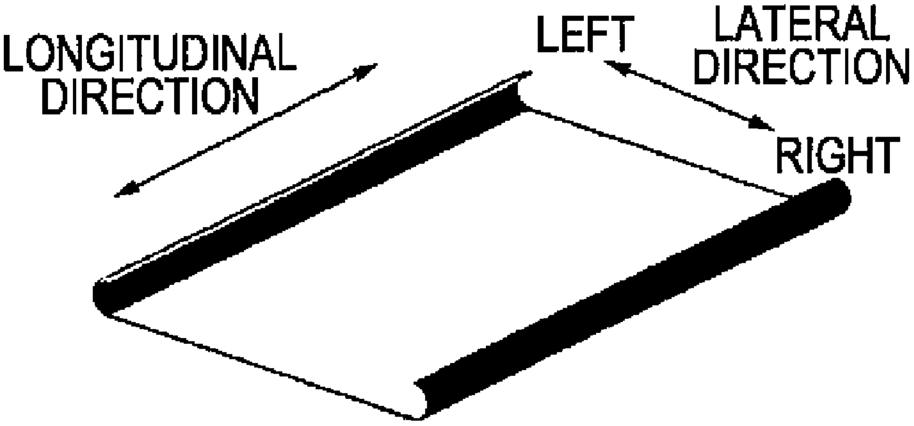
FIGS. 7A and 7B are views illustrating different curls attributable to different ink hit positions.
Figure 7B:
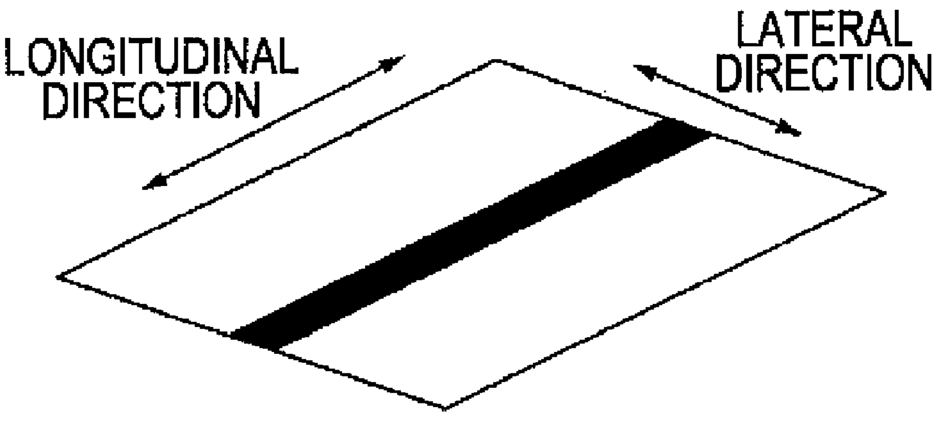

FIGS. 7A and 7B show difference of forms of curls attributable to difference of ink hit positions. With respect to paper of FIG. 7A and FIG. 7B, the same amount of ink Xml is hit to different positions. With respect to the paper of FIG. 7A, ink droplets, each with X/2 ml, are hit to left and right end portions in the lateral direction of the paper. With respect to the paper of FIG. 7B, an ink droplet of X ml is hit to a middle portion in the lateral direction of the paper. As a result, the paper of FIG. 7A curls at the left and right end portions to which the ink is hit, and the paper of FIG. 7B does not curl.

That is, although the amount of the ink hit to the paper is the same, the curl occurs or does not occur according to the position to which the ink is hit. Accordingly, the paper curl state is predicted considering the ink hit position as well as the amount of the ink hit to the paper. That is, the paper curl state is predicted on the basis of distribution of ink hit onto the paper. The paper curl state means, for example, "presence of curl," "curl amount," or "curl position"

Figure 8:
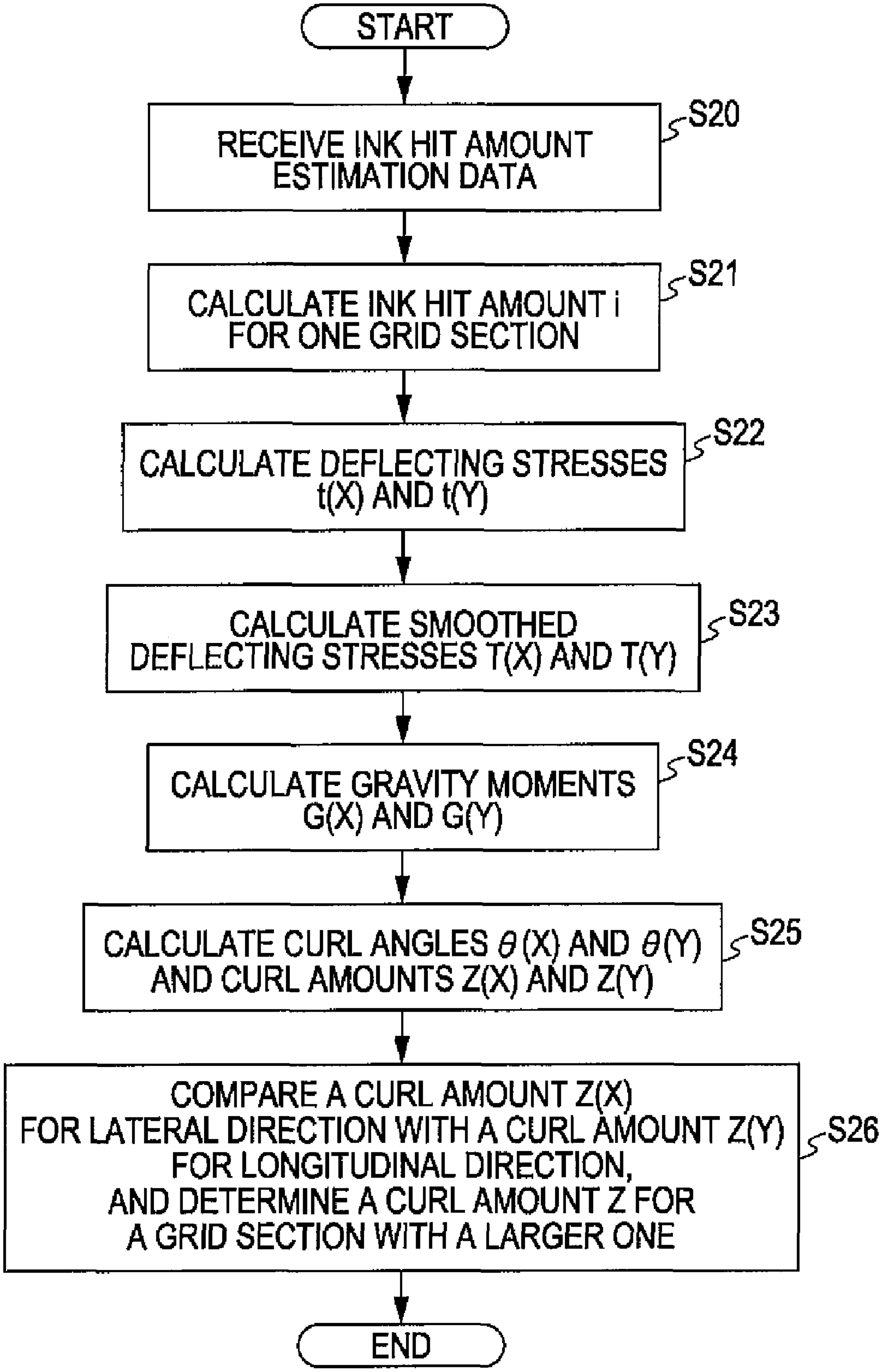
FIG. 8 is a flow illustrating curl prediction processing.
Figure 9A:
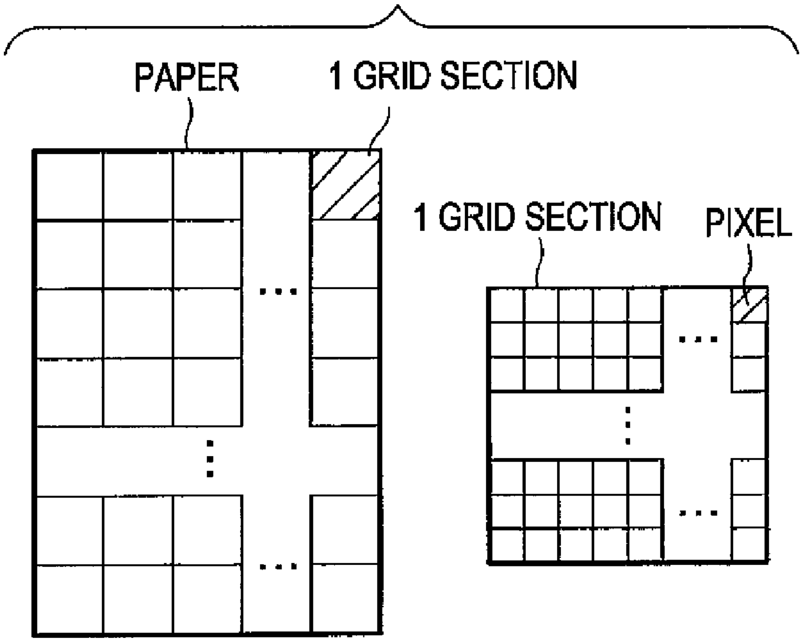
FIG. 9A is a view illustrating a relationship between a section of grid and a pixel and FIG. 9B is a view illustrating a difference between a section of grid with a character which is printed and a section of grid with a solid image which is printed.

FIG. 8 is curl prediction processing flow for judging whether the curl of the print medium P occurs. As shown in the print processing flow (FIG. 6), the hit amount determination portion 234 (ink hit amount estimation module 23*g*) estimates the hit amount of the ink with respect to the image data with reference to the hit amount conversion table 235 (S15). After that, the curl state prediction module (not shown) in the printer driver program 23 predicts the curl state of the print medium P on the basis of the estimated ink hit amount according to the curl prediction processing flow. That is, the printer driver program 23 (particularly the curl state prediction module) corresponds to a curl state prediction unit in claims. First, as shown in FIG. 8, the curl state prediction module predicts the curl state of the print medium P when it receives estimated data of the ink hit amount (S20). Hereinafter, each of processing S21 to S26 will be described in detail. S21: Calculation of an ink amount i for each of sections of grid FIG. 9A shows a relationship between an area (section of grid) specified on the paper and a pixel. The curl state prediction module divides the image data corresponding to one page of the print medium into predetermined areas. Each of the predetermined areas is called "section of grid." The section of grid is a large area in which a plurality of pixels exists. For example, when the hit amount determination portion 234 estimates the ink hit amount, a size of the pixel group (m×n pixels) existing within a range represented by one representative pixel value may be equal to a size of a "section of grid", or alternatively the size of the pixel group may be smaller or larger than the size of a "section of grid." The curl state prediction module calculates the ink hit amount i for each of "sections of grid." on the basis of the ink hit amount estimation data from the ink hit amount estimation module 23*g*.

Figure 9B:
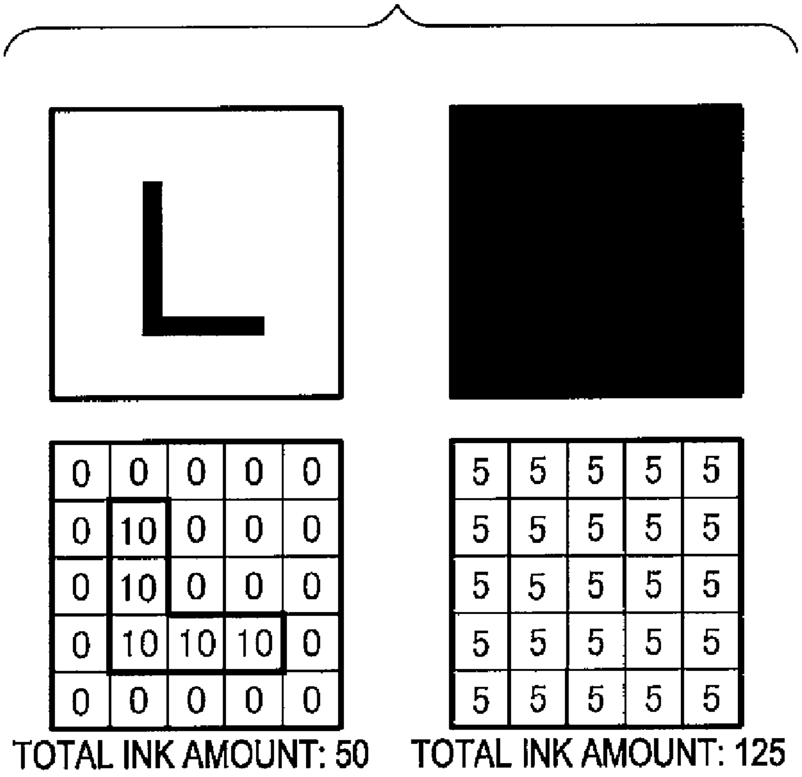

FIG. 9B shows the difference between ink hit amounts at the section of grid in which the character L is printed and the section of grid in which a gray solid image is printed. For explanation, it is assumed that one section of grid is composed of 25 pixels (5×5 pixels). However, the solid image (for example, photograph) makes the print medium P (hereinafter, also referred to as paper) more easily curl than the text image. This is because the solid image needs a larger ink amount hit to the entire paper than the text image. From the point of view of each section of grid (FIG. 9B), the sum of the ink amount hit to the section of grid in which the character L is printed is "50" but the sum of the ink amount hit to the section of grid in which the solid image is printed is "125." However, from the point of view of each pixel, the maximum ink hit amount of the pixel belonging to the section of grid in which the character is printed is "10," and the maximum ink hit amount of the pixel belonging to the section of grid in which the solid image is printed becomes greater than "5." That is, in the text image, the ink is locally hit to only some pixels of the entire pixels. Accordingly, from the point of view of the section of grid which is a larger area than the pixel, the ink hit amount of the solid image is larger than that of the text image. However, from the point of view of a small area, such as pixel, there can be a case in which the ink hit amount of the pixel which constitutes the text image is larger than that of the pixel which constitutes the solid image.

Next, in Step S22, a force of causing the paper to curl (corresponding to a force of causing a curl, hereinafter referring to as deflecting stress) is calculated for each of sections of grid on the basis of the ink hit amount calculated for each of sections of grid (details will be described below). Further, the deflecting stress for each of pixels is calculated on the basis of the ink hit amount calculated for each of the pixels instead of each of sections of grid. So, the deflecting stresses of some pixels of the entire pixels which constitute the character image become larger than those of the pixels which constitute the solid image, and therefore it is predicted such that a curl amount of the paper on which the character image is printed is larger than that of the paper on which the solid image is printed. This contradicts the phenomenon in which the paper of the solid image is more likely to curl than the paper of the text image.

For such a reason, the image data of one page is divided into sections of grid (corresponding to areas specified on a medium), each of which is larger than each of pixels, and the ink amount which is hit to the sections of grid is calculated for each of sections of grid. Thus, it is possible to precisely predict the curl state of the paper by calculating the deflecting stress of the paper on the basis of the ink amount hit to each of sections of grid.

S22: Calculation of Deflecting Stress

Figure 10A:
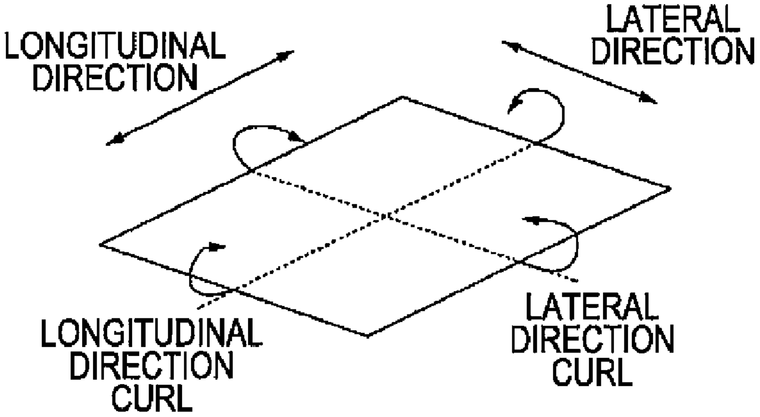
FIG. 10A is a view illustrating the direction in which paper curls.

FIG. 10A shows the direction of the paper curl. Here, the paper curl state is predicted such that a surface of the paper on which the ink is hit (print surface) is the inside surface. In Step S22, the deflecting stress which is the force that the paper is likely to curl is calculated. Since the paper has four sides, as shown in the drawings, there are two cases in which the paper curls in the lateral direction (corresponding to predetermined direction) (hereinafter, referred to as lateral direction curl), and in which the paper curls in the longitudinal direction (corresponding to intersecting direction) (hereinafter, referred to as longitudinal direction curl). What the paper curls in the lateral direction means that an area along the lateral direction on the paper curls in an ark form. On the other hand, what the paper curls in the longitudinal direction means that an area along the longitudinal direction on the paper curls in an arc form.

Figure 10B:
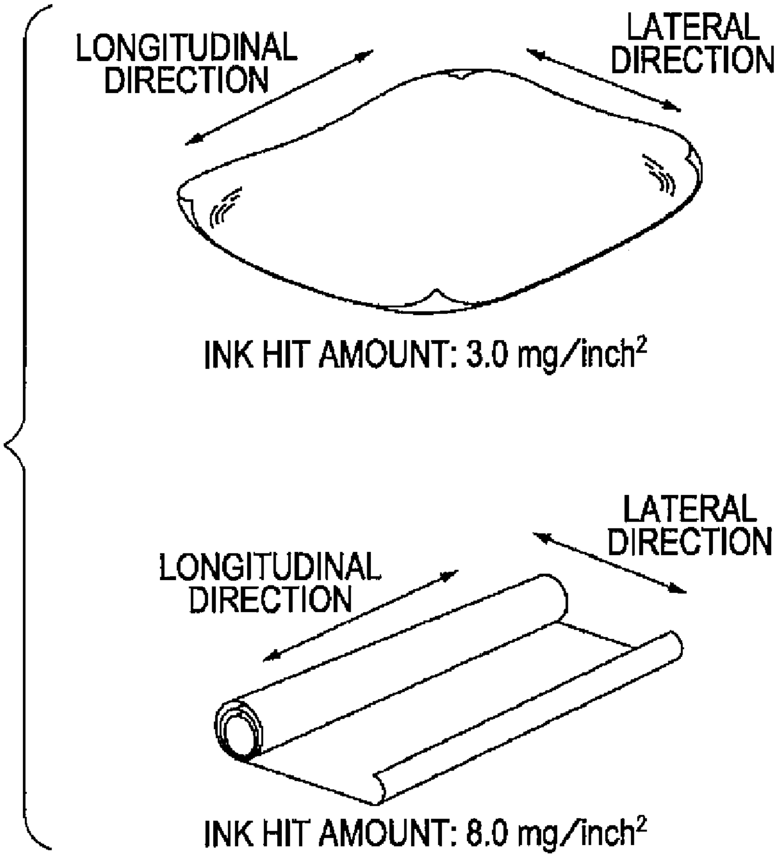
FIG. 10B is a view illustrating the direction in which paper easily curls.

FIG. 10B shows the direction in which the paper easily curls. The paper has the direction of fiber (paper grain), and the paper used here has a structure in which the fiber runs in the longitudinal direction. In this case, the paper easily curls in the lateral direction. When in particular the ink hit amount is small (3.0 mg/inch$^2$), the generation states of the longitudinal direction curl and the lateral direction curls are almost equal to each other. However, when the ink hit amount is large (8.0 mg/inch$^2$), the lateral direction curl more easily occurs than the longitudinal direction curl.

From the above, here the deflecting stress t(x) with respect to the lateral direction curl and the deflecting stress t(y) with respect to the longitudinal direction curl are separately calculated on the basis of the ink hit amount for each of sections of grid.

Figure 10C:
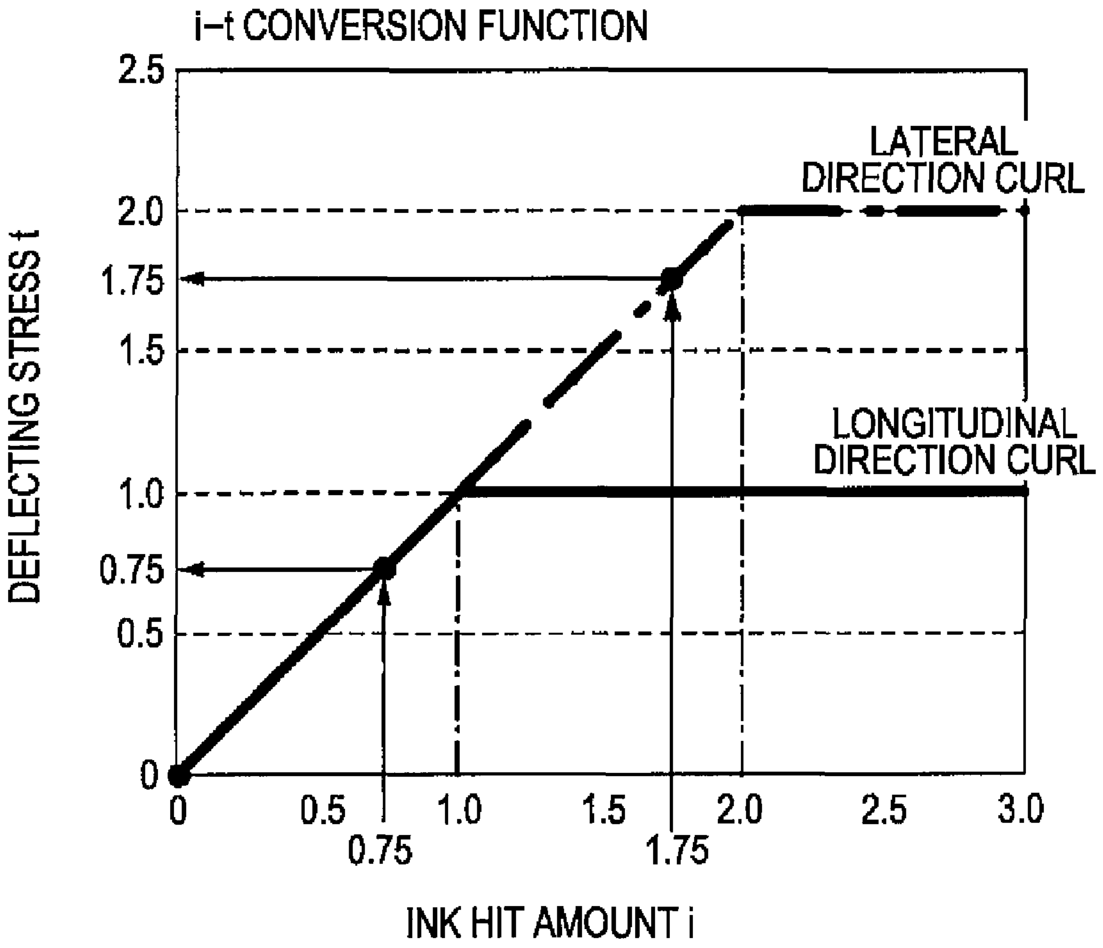
FIG. 10C is a view illustrating a conversion function of an ink hit amount and deflecting stress.

FIG. 10C shows conversion function of the ink hit amount i and the deflecting stress t. A lateral axis shows the ink amount i hit to one section of grid, and a longitudinal axis shows the deflecting stress t. For example, in the case in which the ink hit amount for a certain section of grid i "0.75," the deflecting stresses t(x) and t(y) corresponding to the ink hit amount of 0.75 become "0.75." Further, the ink hit amount i and the deflecting stress t are dimensionless values. In this manner, the deflecting stress is calculated from the ink hit amount for each of sections of grid by using the "ink hit amount i—deflecting stress t conversion function (hereinafter, referred to as i-t conversion function)." The i-t conversion function is calculated empirically (i.e. on the basis of experiment result).

In the i-t conversion function, when the ink hit amount i is below 1.0, a lateral direction curl conversion function and a longitudinal direction curl conversion function are set to be almost the same. When the ink hit amount exceeds a predetermined amount (1.0), the conversion function (dashed-dotted line) to the deflecting stress t(x) with respect to the lateral direction curl and the conversion function (solid line) to the deflecting stress to t(y) with respect to the longitudinal curl are set to be different from each other.

Accordingly, when the ink hit amount i is 1.0 or below, the deflecting stress t(x) with respect to the lateral direction curl and the deflecting stress t(y) with respect to the longitudinal direction curl are almost equal to each other according to calculation. For example, as described above, when the ink hit amount is 0.75, each of the deflecting stress t(x) with respect to the lateral direction curl and the deflecting stress t(y) with respect to the longitudinal direction curl becomes 0.75 (i=0.75→t(x)=t(y)=0.75). On the other hand, when the ink hit amount i exceeds 1.0, the deflecting stress t(x) with respect to the lateral direction curl is a greater value than the deflecting stress t(y) with respect to the longitudinal direction curl according to calculation. For example, when the ink hit amount is 1.75, the deflecting stresses t(x) with respect to the lateral direction curl become 1.75 and the deflecting stresses t(y) with respect to the longitudinal direction curl become 1.0 (i=1.75→t(x)=1.75, t(y)=1.0).

In this manner, the conversion function to the deflecting stress t(x) with respect to the lateral direction curl and the conversion function to the deflecting stress t(y) with respect to the longitudinal direction curl are differently set. In greater detail, saturated deflecting stresses of the conversion function with respect to the lateral direction curl and the conversion function with respect to the longitudinal direction curl are differently set from each other.

When the ink hit amount i is greater than 1.0, no matter how much the ink amount hit to the section of grid increases, the deflecting stress t(y) with respect to the longitudinal direction curl is set to 1.0. That is, saturated deflecting stress of the deflecting stress t(y) with respect to the longitudinal direction curl is 1.0. On the other hand, as the ink hit amount increases 1.0 to 2.0, the deflecting stress t(x) with respect to the lateral direction curl increases. However, when the ink hit amount exceeds 2.0, no matter how much the ink amount hit to the second of grid increases, the deflecting stress does not exceed 2.0. That is, the saturated deflecting stress of the deflecting stress t(y) with respect to the lateral direction curl is 2.0.

As the result from the above, when the ink hit amount is small, it is possible to predict the curl state of the paper by reproducing the phenomenon in which the generation states of the longitudinal direction curl and the lateral direction curl are almost equal to each other. On the other hand, when the ink hit amount is large, it is possible to predict the curl state of the paper by reproducing the phenomenon in which the lateral direction curl more easily occurs than the longitudinal direction curl. As a result, it is possible to more precisely predict the curl state of the paper.

Figure 11:
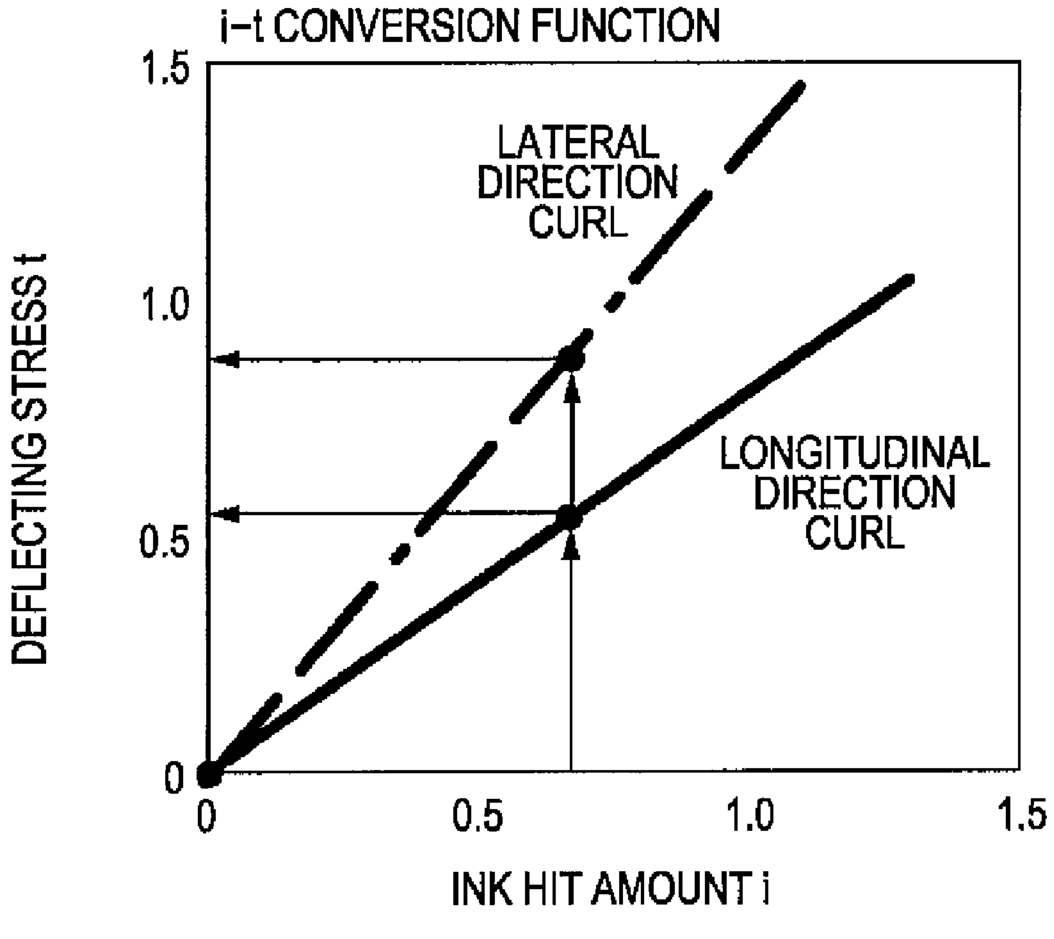
FIG. 11 is a view illustrating modification of i-t conversion function.

FIG. 11 shows modification of the i-t conversion function. In the conversion function shown in FIG. 10C, the phenomenon in which the lateral direction curl more easily occurs than the longitudinal direction curl when the ink hit amount is large is reproduced by setting the saturated deflecting stress with respect to the lateral direction curl to be greater than the saturated deflecting stress with respect to the longitudinal direction curl. However, operation of the conversion function may not be limited thereto. For example, like the conversion function shown in FIG. 11, slops of the lateral direction curl conversion function (dashed-dotted line) and the longitudinal direction curl conversion function (solid line) may be set to be different. In FIG. 11, the slope of the lateral direction curl conversion function (slope with respect to a lateral axis) is set to be greater than the slope of the longitudinal direction curl conversion function. According to the i-t conversion function, when the ink hit amount is small, a difference between the deflecting stress t(x) with respect to the lateral direction curl and the deflecting stress t(y) with respect to the longitudinal direction curl becomes small, but when the ink hit amount is large, the difference between the deflecting stress t(x) with respect to the lateral direction curl and the deflecting stress t(y) with respect to the longitudinal direction curl becomes large. As a result, when the ink hit amount is large, it is possible to reproduce the phenomenon in which the lateral direction curl more easily occurs than the longitudinal direction curl, and thus it is possible to precisely predict the curl state of the paper.

In this manner, the deflecting stress t(x) of each section of grid for the lateral direction curl and the deflecting stress t(y) of each section of grid for the longitudinal direction curl are calculated on the basis of the ink amount hit to each of sections of grid (ink hit amount i→deflecting stress t (x), t(y)). Accordingly, after the deflecting stresses of all sections which constitute one page of image data are calculated, the flow progresses to next processing.

S23: Smoothing Deflecting Stress

Figure 12A:
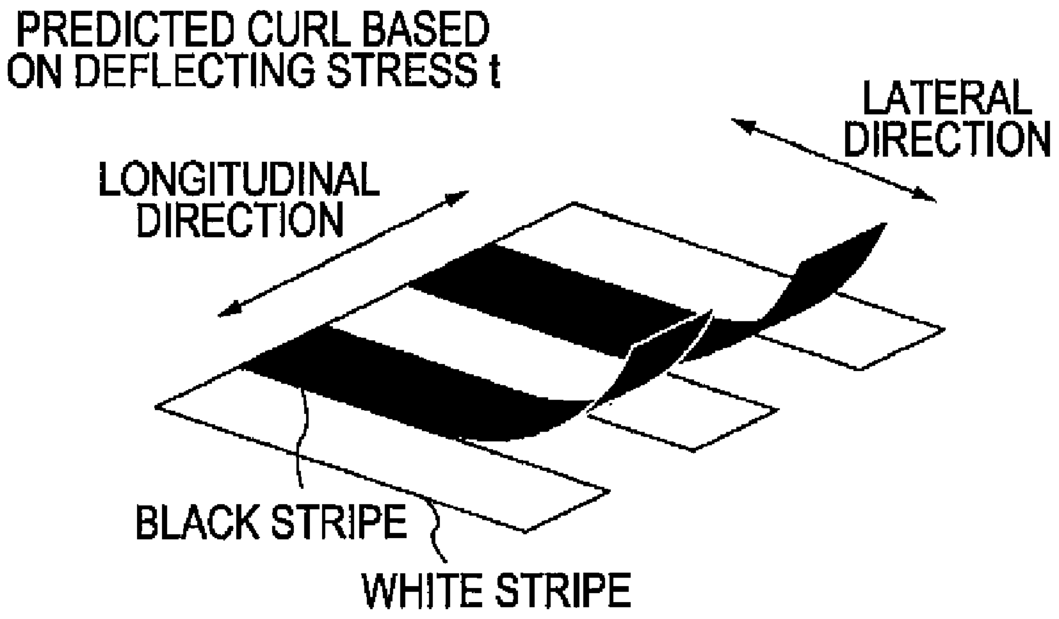
FIG. 12A is a view illustrating prediction of paper curl using deflecting stress t.
Figure 12B:
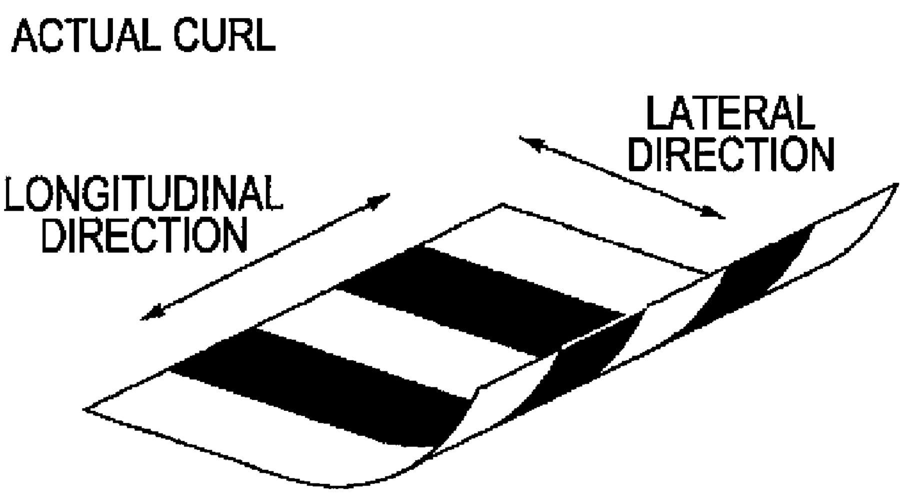
FIG. 12B is a view illustrating a posture in which paper actually curls.

FIG. 12A shows a paper curl predicted using the deflecting stress t for each of sections of grid which is calculated in Step S22, and FIG. 12B shows an actual paper curl. If a lateral stripe is printed on the paper, an area hit by ink (hereinafter, referred to as black stripe), and an area which is not hit by ink (hereinafter, referred to as white stripe) are alternately printed in the longitudinal direction. Since the ink hit amount i of the section of grid belonging to the white stripe is zero, the deflecting stress t(x) with respect to the lateral direction curl of the section of grid belonging to the white stripe is also zero. Accordingly, it is predicted such that the white stripe does not curl and the planar state is maintained. On the other hand, since the ink is hit to the section of grid belonging to the black stripe, the deflecting stress t(x) with respect to the lateral direction curl is imparted to the sections of grid which belong to the black stripe. Accordingly, it is predicted such that the black stripe curls in the lateral direction. As a result, if the paper curl is predicted only on the basis of the deflecting stress t(x) calculated in Step S003, as shown in FIG. 10A, the white stripe does not curl and the lateral direction curl occurs at only the black stripe. The paper curl for the white stripe and the paper curl for the black stripe are separately predicted as if the paper is split into the white stripes and the black stripes.

However, the paper is practically an integrated object. Accordingly, there is no possibility that only the black stripes (areas hit by ink) curl but the white stripes (areas which are not hit by ink) do not curl. Practically, as show in FIG. 12B, the white stripes come to curl as they are pulled by the deflecting stresses of the black stripes. That is, the paper curl does not discontinuously occur but continuously occur. Accordingly, in the case in which the deflecting stress t is imparted to a certain section of grid, it can be seen that the deflecting stress t also affects the sections of grid which exist around the certain section of grid. For such a reason, if the paper curl state is predicted only by the deflecting stresses t for every section of grid which is calculated in Step S22, incorrect curl state is predicted. In greater detail, in the case in which the lateral direction curl occurs, the deflecting stress t of sections of grid which are arranged in the longitudinal direction of the certain section of grid affect the paper curl. On the other hand, in the case in which the longitudinal direction curl occurs, the deflecting stresses t of sections arranged in the lateral direction of the certain section of grid affect the paper curl.

Accordingly, in Step S23, the deflecting stress t of the certain section of grid is converted to the deflecting stress T in which the deflecting stresses t of the sections of the grid which exist around the certain section of grid are considered. That is, the deflecting stresses of sections of grid which belong to the image data corresponding to one page are smoothed (gradating, differentiating weighting), and the paper curl state is predicted on the basis of the deflecting stresses T which are smoothed (hereinafter, referred to as smoothed deflecting stress T). Further, the deflecting stresses t(x) with respect to the lateral direction curl and the deflecting stresses t(y) with respect to the longitudinal direction curl are separately smoothed. When the deflecting stresses t(x) with respect to the lateral direction curl are smoothed, the deflecting stresses t(y) of the sections of grid which are arranged in the longitudinal direction of a target section of grid which is to be smoothed (hereinafter, referred to as target section) are more significantly considered than the deflecting stresses t(x) of the sections of grid which are arranged the lateral direction of the target section. Further, when smoothing the deflecting stresses t(y) with respect to the longitudinal direction curl, the deflecting stresses of the sections of grid which are arranged in the lateral direction of the target section are more significantly considered than the deflecting stress of the sections of grid which are arranged in the longitudinal direction of the target section.

Calculation equation for the smoothed deflecting stress T is shown below. Here, the direction of the image data corresponding to the lateral direction of the paper is defined as to X direction, and the direction of the image data corresponding to the longitudinal direction of the paper is defined as Y direction. Coordinates of sections of grid in the image data of one page are expressed in (i, j). "i" is a position in the X direction (lateral direction), and "j" is a position in the Y direction (longitudinal direction). Coordinates (i, j) of sections for smoothing the deflecting stresses t are expressed in (x, y), the calculated smoothed deflecting stresses are expressed in T(X, y), and filter coefficients for smoothing are expressed in cnv(i-x, j-y). The smoothed deflecting stresses T are also dimensionless values.

$$T(x, y) = \sum_{i}\sum_{j} cnv(i-x,\ j-y)\times t(i,\ j) \qquad \text{Equation 1}$$

That is, the smoothed deflecting stress T(x, y) of the target section is a value obtained by integrating values obtained by multiplying the deflecting stresses t(i, j) of sections exiting around the target section by the filter coefficients cnv(i-x, j-y) of the corresponding sections.

Figure 13:
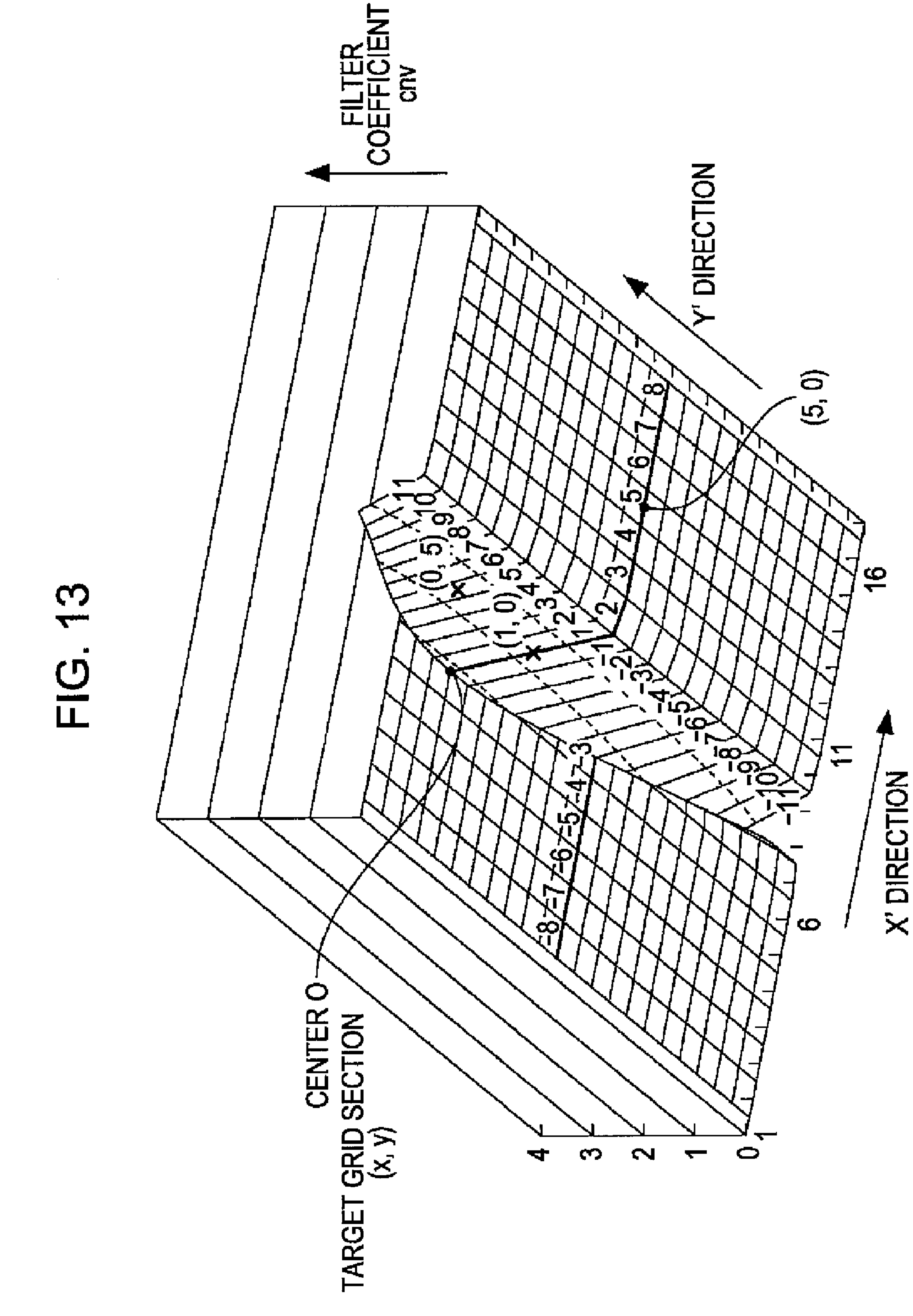
FIG. 13 is a graph illustrating filter coefficient for lateral direction curl.

FIG. 13 is a graph illustrating filter coefficients cnv used when calculating the smoothed deflecting stresses T(x) with respect to the lateral direction curl. Hereinafter, the filter coefficient with respect to the lateral direction curl will be described. A value in a direction perpendicular to a X'Y' plane is the filter coefficient cnv. A small section of grid drawn on the X'Y' plane corresponds to a section of grid specified in the image data in Step S21, X' direction correspond to the X direction (lateral direction), and Y' direction corresponds to the Y direction (longitudinal direction). Thus, when calculating the smoothed deflecting stresses T(x, y), the coordinate (x, y) of the target section is aligned with a center O of the filter coefficient cnv.

The filter coefficient cnv is expressed in the following equation (normal distribution). "A" in the filter coefficient cnv (A, B) indicates distance from the target section (center O) in the X direction, and "B" indicates distance from the target section (center O) in the Y direction. "a" indicates a gradating width in the X direction (for example, 5 mm), and "b" indicates a gradating width in the Y direction (for example, 100 mm). The gradating widths a and b are standard variations in the normal distribution, and corresponds to the ranges which significantly affect the deflecting stress of the target section.

$$cnv(A, B) = \frac{1}{2\pi ab}\cdot e^{-\left(\left(\frac{A^2}{2a^2}\right)+\left(\frac{B^2}{2b^2}\right)\right)}$$

On the graph of FIG. 13, the filter coefficient cnv(A, B) of the fifth section on the right side of the center O in the X direction, i.e. cnv (5, 0) is almost equal to zero. Accordingly, when calculating the smoothed deflecting stress T(x, y) of the target section, the deflecting stress t(x+5, y) of the fifth section from the target section on the right side of the target section is integrated, resulting in the value, zero. This means that the deflecting stresses t of the fifth section from the target section on the right side of the target section in the lateral direction does not affect the curl state of the target section. The value in the perpendicular direction at the center of the sections of grid drawn on the X'Y' plane of the graph of FIG. 13 is the filter coefficient of the section. On the other hand, the filter coefficient cnv (1, 0) of the first section of grid on the right side of the center O in the X direction is about 1.5

(average value). Accordingly, when calculating the smoothed deflecting stress T(x, y) of the target section, a value of 1.5 times of the deflecting stress t(x+1, y) of the section next to the target section on the right side is integrated. This means that the deflecting stress t of the first neighboring section of grid on the right side of the target section in the lateral direction significantly affects the curl state of the target section.

In the calculation equation of the filter coefficient cnv(A, B) with respect to the lateral direction curl, the gradating width b of the Y direction is set to be larger than the gradating width a of the X direction. Accordingly, in the graph (FIG. 13) showing the filter coefficients, values of the filter coefficients of sections distanced from the center O in the Y' direction are relatively great. For example, the filter coefficient cnv(5, 0) of the fifth section on the right side of the center O in the X' direction is almost zero, but the filter coefficient cnv(0, 5) of the fifth section on the upper side of the center O in the Y' direction is about 1.4. According to the graph of FIG. 13, it can be seen that the deflecting stresses t of the target section and two adjacent sections on the left and right sides of the target section, respectively in the X direction, and the deflecting stresses of sections in the range of 11 grids on each of the upper side and the lower side section in the Y direction significantly affect the smoothed deflecting stress T(x) of the target section with respect to the lateral direction curl. That is, when smoothing the deflecting stresses t(x) with respect to the lateral direction curl, the sections arranged next to the target section in the Y direction affect the smoothed deflecting stress T (likelihood of curl) of the target section over a relatively long length compared to the sections arranged next to the target section in the X direction.

On the other hand, when smoothing the deflecting stress t(y) with respect to the longitudinal direction curl, a value of the gradating width a of the X direction (for example, 100 mm) is set to be greater than that of the gradating width b of the Y direction (for example, 5 mm). As a result, a graph of filter coefficients of the longitudinal direction curl is a X'Y' direction switched form of the graph of FIG. 13 showing the filter coefficients of the lateral direction curl (the filter coefficients of the Y' direction of FIG. 13 become filter coefficients of sections arranged in the lateral direction of the target section, and the filter coefficients of the X' direction of FIG. 13 become filter coefficients of sections arranged in the longitudinal direction of the target section). Accordingly, for example, it can be seen that the deflecting stresses t of two sections adjacent to the target section on the upper side and the lower sides respectively in the Y direction, and the deflecting stresses of sections in the range of 11 grids on each of the left and right sides of the target section in the X direction significantly affect the smoothed deflecting stress T(y) of the target section with respect to the longitudinal curl.

Figure 14A:
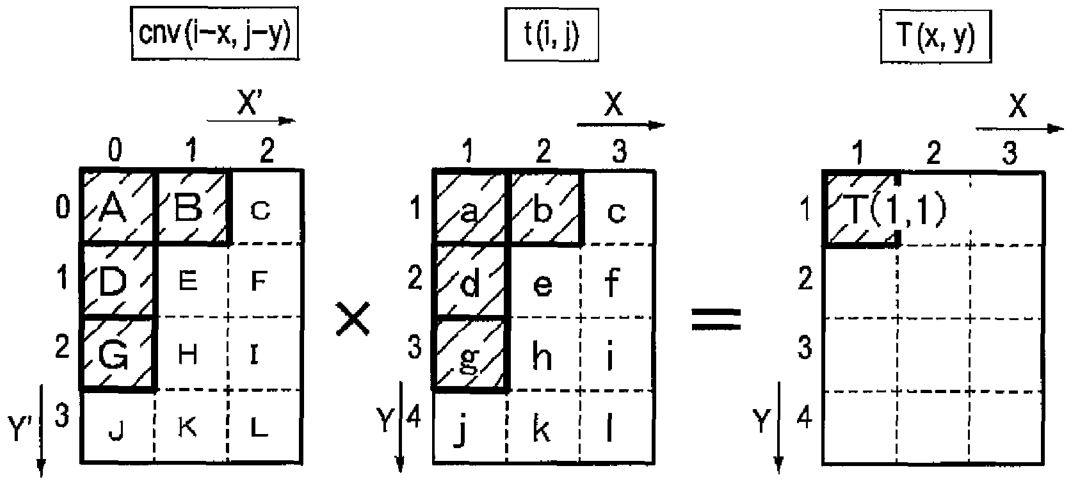
FIG. 14A and FIG. 14B are views illustrating concrete examples of calculation of smoothed deflecting stress.
Figure 14B:
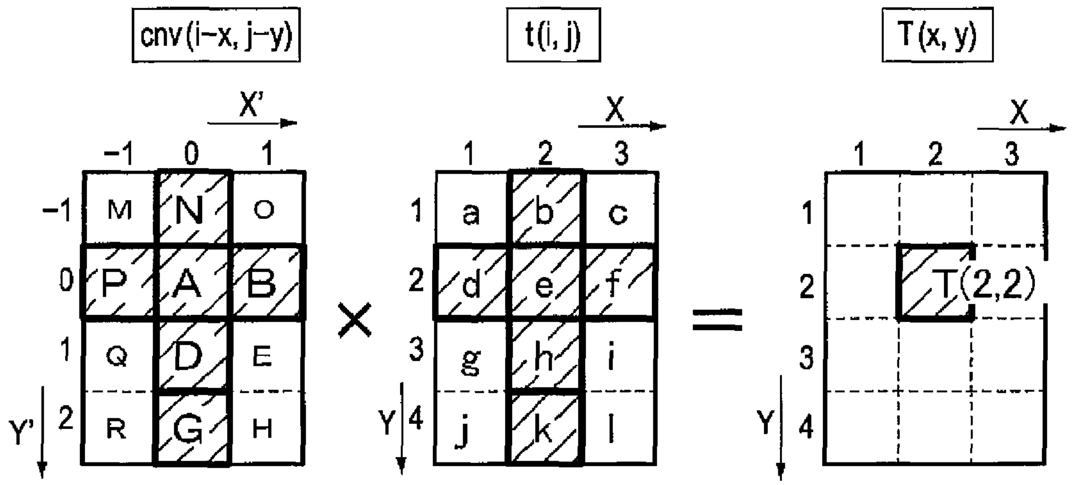

FIGS. 14A and 14B shows concrete examples of calculation of the smoothed deflecting stress T(x) with respect to the lateral direction curl. For explanation, the image data of one page is composed of "3×4 sections of grid" in "lateral (X) and longitudinal (Y) directions." Of the sections of grid which constitute the image data of one page, a coordinate (i, j) of the left and uppermost section is set to (1, 1), and values of i of the coordinates of sections arranged in the X direction are incremented so that the coordinates become (i+1, j) as the sections become nearer the right end portion of the grid in the X direction. Further, values of j of the coordinates of sections arranged in the Y direction are incremented so that the coordinates become (i, j+1) as the sections become nearer the lower end portion of the grid and farther from the left uppermost section in the Y direction. Each of values of the filter coefficients cnv of sections (hatched sections) arranged respectively on the left and right sides of the target section (hatched section)(i.e. one section on the left side of the target section and one section on the right side of the target section) in the X direction is set to "1." Further, each of values of the filter coefficients cnv of four sections (hatched sections) arranged respectively on the upper and lower sides of the target section (hatched section)(i.e. two sections on the upper side of the target section and two sections on the lower side of the target section) in the Y direction is set to "1." A value of the filter coefficients of the other sections is set to "0." Further, the filter coefficient corresponding to the coordinate (x, y) of the target section corresponds to the center (0, 0) of the filter coefficients.

First, if the smoothed deflecting stress T(1, 1) is calculated by Equation 1 when the left uppermost section (1, 1) is the target section, the following result is obtained (FIG. 14A).

$$T(1,1)=cnv(0,0)\times t(1,1)+cnv(1,0)\times t(2,1)+cnv(2,0)\times t(3,1)+cnv(0,1)\times t(1,2)+cnv(1,1)\times t(2,2)+cnv(2,1)\times t(3,2)+cnv(0,2)\times t(1,3)+cnv(1,2)\times t(2,3)+cnv(2,3)\times t(3,3)+cnv(0,3)\times t(1,4)+cnv(1,3)\times t(2,4)+cnv(2,3)\times t(3,4)=A\times a+B\times b+C\times c+D\times d+E\times e+F\times f+G\times g+H\times h+I\times i+J\times j+K\times k+L\times l.$$

No section exists on the left side of the left uppermost section (1, 1) which is the target section, and no section also exists on the upper side of the target section. Accordingly, the filter coefficients A, B, D, and G=1, and the filter coefficients C, E, F, H, I, J, K, and L=0. Thus, the smoothed deflecting stress T (1, 1) is expressed by the following equation.

$$T(1,1)=A\times a+B\times b+D\times d+G\times g.$$

In the similar manner, the smoothed deflecting stress T(2, 2) of the second section from both of the left end portion and the upper end portion of the grid is calculated (FIG. 14B). The filter coefficient of the center, cnv(0, 0)=A, becomes the filter coefficient corresponding to the target section (2, 2), for example, the filter coefficient corresponding to the right-side neighboring section (3, 2) of the target section (2, 2) becomes, cnv(1, 0)=B. The smoothed deflecting stress T(2, 2) of the target section is affected by the deflecting stresses of one section on the upper side of the target section in the Y direction, two sections on the lower side of the target section, and two sections respectively arranged on the left and right sides of the target section in the X direction (i.e. one section on each side of the left side and the right side). Accordingly, the value of the filter coefficients N, P, A, B, D, and G=1, and the value of the filter coefficients M, O, Q, E, R, and H=0. As a result, the smoothed deflecting stress T(2, 2) is expressed as follows:

$$T(2,2)=N\times b+P\times d+A\times e+B\times f+D\times h+G\times k$$

In this manner, the deflecting stresses t(x), t(y) of sections of grid which belong to the image data of one page are smoothed, and the smoothed deflecting stresses T(x), T(y) are calculated. As a result, it is possible to reproduce the phenomenon in which as the deflecting stresses t of surrounding sections are considered, although it is an area with a small ink hit amount (for example, white stripe of FIG. 12), the area comes to curl because the area is pulled by a force of causing the surrounding areas (for example, black stripe of FIG. 12) hit by the ink to curl. That is, it is possible to predict such that the paper curl continuously occurs, and also to more precisely predict the paper curl state.

Figure 15:
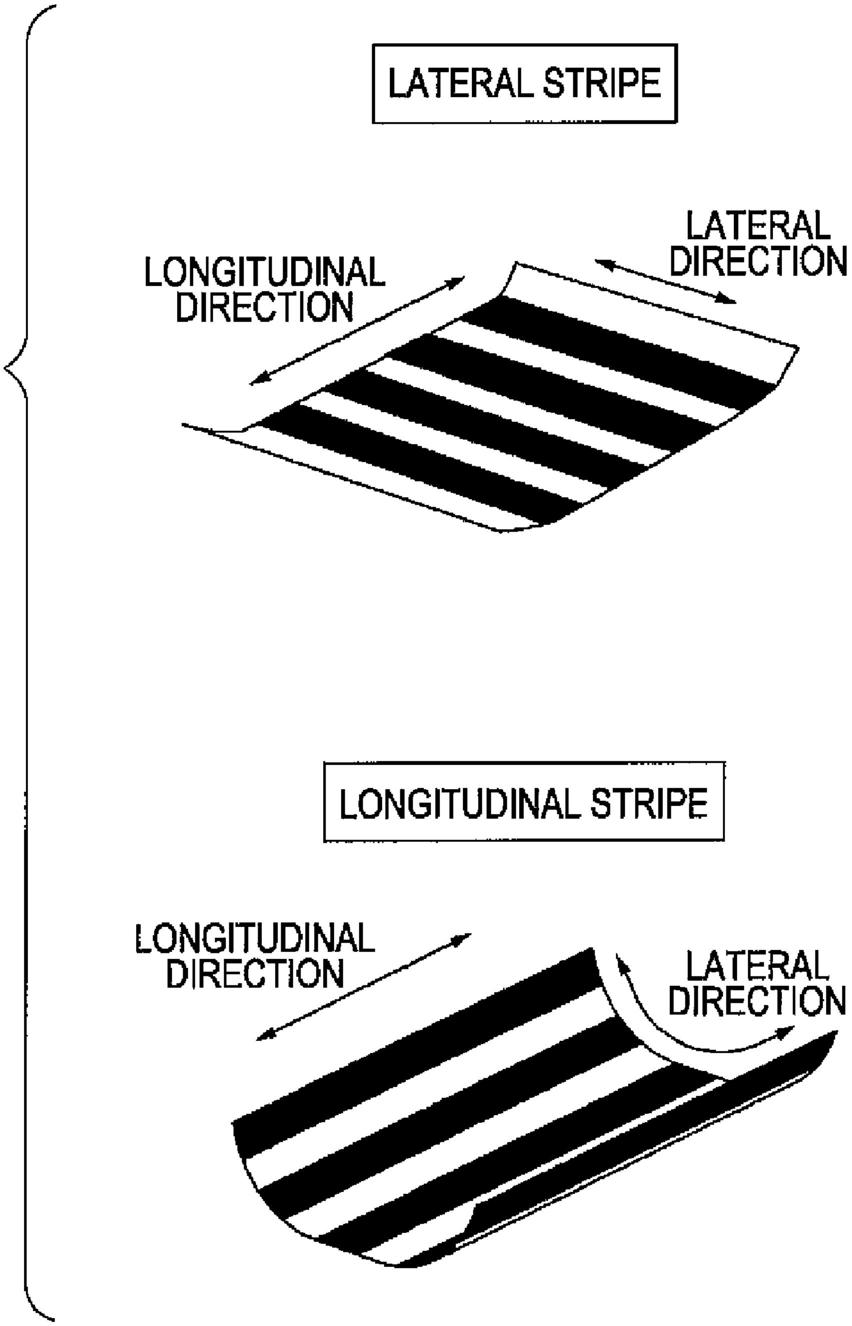
FIG. 15 is a view illustrating a difference between forms of paper curls of a lateral strip print and a longitudinal stripe print.

FIG. 15 shows a difference between the paper curl states of the case in which lateral stripes are printed on paper and the case in which longitudinal stripes are printed on paper. In the case of lateral stripe print, the paper is likely to curl in the longitudinal direction. Conversely, in the case of longitudinal stripe print, the paper is likely to curl in the lateral direction.

However, since the paper tends to curl in a direction intersecting a direction of grains of paper, with this embodiment, the lateral direction curl of the longitudinal stripe print becomes larger than the longitudinal direction curl of the lateral stripe print. For example, in the case of the lateral stripe print, as shown in FIG. 12A, no matter how much the black stripe tries to curl in the lateral direction, since the white stripe adjacent to the black stripe in the longitudinal direction tries to maintain the planar state, the deflecting stress with respect to the lateral direction curl is alleviated. Conversely, in the case of longitudinal stripe print, since the deflecting stresses of the black stripes formed along the longitudinal direction overlap, the paper easily curls in the lateral direction compared to the case of lateral stripe print. That is, it can be said that the paper more easily curls in the direction interesting the direction in which a longer range is hit by ink.

Accordingly, here, in the filter coefficient cnv for calculating the smoothed deflecting stress T(x) of the lateral direction curl, the gradating width b of the Y direction is set to be larger than the gradating width a of the X direction (lateral a<longitudinal b). That is, as shown in the filter coefficient cnv graph of FIG. 13, sections arranged in the longitudinal direction of the target section affects the smoothed deflecting stress T(x) of the target section with respect to the lateral direction curl over a wider range than sections arranged in the lateral direction of the target section (that is, when a liquid amount of the target section is converted to the smoothed deflecting stress with respect to the lateral direction curl, the liquid amount of the sections arranged in the longitudinal direction of the target section relatively significantly affects the curl compared to the sections arranged in the lateral direction of the target section). Like the longitudinal stripe print, in the case in which the deflecting stresses t of the sections arranged in the longitudinal direction of the target section are large, since the deflecting stresses t of a lot of sections arranged in the longitudinal direction of the target section are integrated, a value of the smoothed deflecting stress T(x) with respect to the lateral direction curl increases.

Conversely, in the filter coefficient cnv for calculating the smoothed deflecting stress T(y) of the longitudinal direction curl, the gradating width a of the X direction is set to be larger than the gradating width b of the Y direction (lateral a>longitudinal b). That is, the sections arranged in the lateral direction of the target section affect the smoothed deflecting stress T(y) with respect to the longitudinal direction curl of the target section over a wider range than the sections arranged in the longitudinal direction of the target section. Accordingly, like the longitudinal stripe print, in the case in which the value of the deflecting stresses t of the sections arranged in the lateral direction of the target section is small, the value of the smoothed deflecting stress T(y) with respect to the longitudinal direction curl is small.

The paper curls in one direction, either the longitudinal direction or the lateral direction. Accordingly, like the longitudinal stripe print, in the case in which the smoothed deflecting stress T(x) with respect to the lateral direction curl has a greater value than the smoothed deflecting stress T(y) with respect to the longitudinal direction curl, it is predicted such that the paper curls in the lateral direction. This supports the phenomenon in which the lateral direction curl more easily occurs in the case of the longitudinal stripe print (the case in which the ink is hit to the paper over a long length in the longitudinal direction).

On the other hand, in the case of the lateral stripe print, the ink is hit to the paper over a long length in the lateral direction. Accordingly, the smoothed deflecting stress T(x) with respect to the lateral direction curl becomes a small value because the deflecting stresses t of the sections arranged in the longitudinal direction of the target section are small. The smoothed deflecting stress T(y) with respect to the longitudinal direction curl becomes a large value because the deflecting stresses t of the sections arranged in the lateral direction of the target section are integrated. As a result, as shown in FIG. 15, in the case of the lateral stripe print (the case in which the ink is hit to the paper so as to elongate in the lateral direction), it is possible to predict such that the paper is likely to curl in the longitudinal direction.

That is, with this embodiment, in order to reproduce the phenomenon in which the paper is likely to curl in the direction intersecting the direction in which the ink hits over a long length on the paper, in the case of smoothing the deflecting stress t(x) with respect to the lateral direction curl, the deflecting stresses of the sections arranged in the longitudinal direction of the target section are more significantly considered (a<b) than the deflecting stresses of the sections arranged in the lateral direction of the target section, but in the case of smoothing the deflecting stress t(y) with respect to the longitudinal direction curl, the deflecting stresses of the sections arranged in the lateral direction of the target section is more significantly considered (a>b) than the deflecting stresses of the sections arranged in the longitudinal direction of the target section. As described above, since whether the longitudinal direction curl is likely to occur or whether the lateral direction curl is likely to occur is considered according to the ink hit direction, it is possible to more precisely predict the curl state of the paper.

Modification of Smoothing of Deflecting Stress

Figure 16:
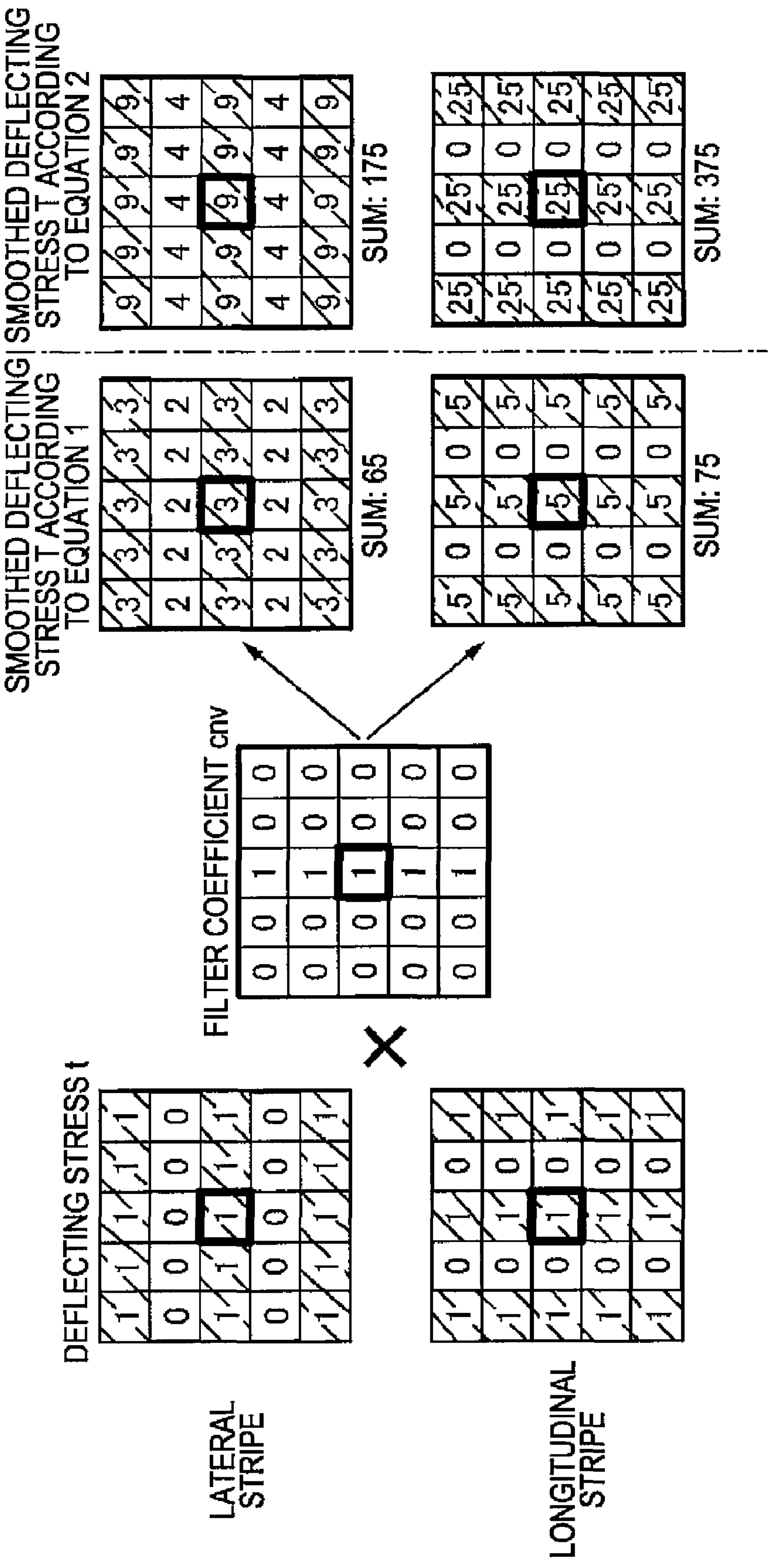
FIG. 16 is a view illustrating a difference between Deflecting Stress Smoothing Equation 1 and Deflecting Stress Smoothing Equation 2 which is a modification of Deflection Stress Smoothing Equation 1.

FIG. 16 shows a difference between Deflecting stress smoothing equation 1 and Deflecting stress smoothing equation 2 according to one modification. On the left side of FIG. 14, the deflecting stresses t of some portion (5×5 grid) of the image data for printing the lateral stripe are shown, and the difference with the deflecting stresses t of some portion of the image data for printing the longitudinal stripe is also shown. The deflecting stress of the section hit by ink is set to "1," and the deflecting stress of the section which is not hit by ink is set to "0." In order to calculate the smoothed deflecting stress T with respect to the lateral direction curl, it is assumed that deflecting stress t of four sections respectively on the upper and lower sides of the target section in the longitudinal direction (i.e. two sections on each side of the upper side and the lower side) affect the curl of the target section. Accordingly, from the point of view of the filter coefficient cnv, the filter coefficient cnv of the sections arranged in the longitudinal direction of the target section (bold line) at the center is set to "1" and the filter coefficient of the other sections is set to "0."

As a result, according to Deflecting stress smoothing equation 1, the smoothed deflecting stress of the target section (bold line) at the center becomes "3" in the case of lateral stripe print and "5" in the case of longitudinal stripe print. In the similar manner, the smoothed deflecting stresses T of the other sections are calculated. As a result, in the case of the lateral stripe print, a row of sections having the value "3" as the deflecting stress of the section and arranged in the lateral direction, and a row of sections having the value "2" as the deflecting stress of the section and arranged in the lateral direction are alternately arranged in the longitudinal direction. On the other hand, in the case of the longitudinal stripe print, a row of sections having the value "5" as the deflecting stress of the section and arranged in the longitudinal direction and a row of sections having the value "0" as the deflecting stress of the section and arranged in the longitudinal direction are alternately arranged in the lateral direction.

Here, as shown in FIG. 15, in the case of the longitudinal stripe print, the paper is relatively likely to curl in the lateral direction compared to the case of the lateral stripe print. According to the smoothed deflecting stress T with respect to the lateral direction curl which is calculated in Equation 1, the maximum deflecting stress of sections with respect to the lateral direction curl of the section in the lateral stripe print is the value "3" but the maximum deflecting stress with respect to the lateral direction curl of the sections in the longitudinal stripe print is the value "5." Accordingly, the phenomenon in which the longitudinal stripe print makes the lateral direction curl more easily occurs than the lateral stripe print. In 5×5 grid, from the point of view of the sum of the smoothed deflecting stresses T with respect to the lateral direction curl, the longitudinal stripe print is the value "75" which is greater than the value "65" of the lateral stripe print. Accordingly, the phenomenon in which the paper more easily curls in the lateral direction in the case of the longitudinal stripe print than in the case of the lateral stripe print.

Further, as shown in FIG. 15, the curl amount of the lateral direction curl of the longitudinal stripe print is larger than that of the longitudinal direction curl of the lateral stripe print. Accordingly, in order to strongly reproduce the phenomenon in which the longitudinal stripe print more easily causes the lateral direction curl than the lateral stripe print, the deflecting stresses may be smoothed using Equation 2 which follows:

$$T(x, y) = \left\{ \sum_i \sum_j cnv(i-x, j-y) \times t(i, j)^{\frac{1}{\gamma}} \right\}^{\gamma} \quad \text{Equation 2}$$

According to modification of Equation 2, each of values of the before-smoothing deflecting stresses t raised to the 1/γ-th power is multiplied by the corresponding filter coefficient cnv, and then the resultant values are integrated. After that, the resultant value of the integration is raised to the γth power. γ is a value greater than 1.

With this embodiment, in the calculation equation of the filter coefficient cnv of the later direction curl, the gradating width b of the longitudinal direction is set to be larger than the gradating width a of the lateral direction. Accordingly, in the case of performing the longitudinal stripe print, the smoothed deflecting stress T with respect to the lateral direction curl of the stripe hit by the ink is large, and the smoothed deflecting stress T with respect to the lateral direction curl of the stripe which is not hit by the ink is small. They have a large difference. On the other hand, in the case of performing the lateral stripe print, the difference between the deflecting stresses of the stripe hit by the ink and the stripe which is not hit by the ink with respect to the lateral direction curl of the stripe is small. Accordingly, the section hit by the ink in the in the longitudinal stripe print is larger than the section hit by the ink in the lateral stripe print in the value obtained by integrating values obtained by multiplying the filter coefficients cnv by the deflecting stresses t. For such a reason, it is possible to increase the difference between the deflecting stresses with respect to the lateral direction curl in the lateral stripe print and the longitudinal stripe print by raising the value, which is obtained by multiplying the filter coefficients cnv by the deflecting stresses t raised to the 1/γ-th power, and then integrating the values obtained by the multiplication to the γ-th power.

FIG. 16 shows the result of calculation of the smoothed deflecting stress T according to Equation 2 when a highlighting factor γ is 2. The smoothed deflecting stress T of the section hit by the ink in the lateral stripe print becomes "9," and the smoothed deflecting stress T of the section hit by the ink in the longitudinal stripe print becomes "25." From the point of view of the sum of the smoothed deflecting stresses T of a 5×5 grid, the sum for the longitudinal stripe print becomes "375," and can be larger than the sum for the lateral stripe print, "175." Accordingly, it is possible to emphatically reproduce the phenomenon in which the lateral direction curl more easily occur in the longitudinal stripe print than in the lateral stripe print by using Equation 2 when calculating the smoothed deflecting stresses with respect to the lateral direction curl. Further, it is possible to emphatically reproduce the phenomenon in which the longitudinal paper curl more easily occurs in the lateral stripe print than in the longitudinal stripe print by using Equation 2 when calculating the smoothed deflecting stresses with respect to the longitudinal direction curl.

S24: Calculation of Gravity Moment

The paper has mass. Accordingly, a force of suppressing the paper curl, which is attributable to the weight of the paper, acts to inhibit the paper curl, resisting against the deflecting stress which is generated by the hit of ink and causes the paper to curl. However, as shown in FIG. 7B, the paper more easily curls in the case in which "center portion of paper" is hit by the ink than in the case in which "end portion of paper" is hit by the ink. This is because the deflecting stress must beat the curl inhibiting force attributable to the weight of part of the paper which ranges from the center portion of the paper to the end portion of the paper when the center portion of the paper curls. Accordingly, even if the same amount of ink is coated on the entire area of the paper, it is harder for the center portion of the paper to curl than for the end portion of the paper to curl.

In Step S24, the curl inhibiting force attributable to the weight of part of the paper which ranges from a certain section to the paper end portion is calculated for each of the sections. The curl inhibiting force is calculated by integrating moment forces generated by the weights of sections positioned between the certain section and the paper end portion when setting the certain section (target section) as the center. Hereinafter, the curl inhibiting force is called gravity moment G. In the subsequent step, S25, the paper curl state is predicted from the difference between the smoothed deflecting stress T and the gravity moment G.

Figure 17A:
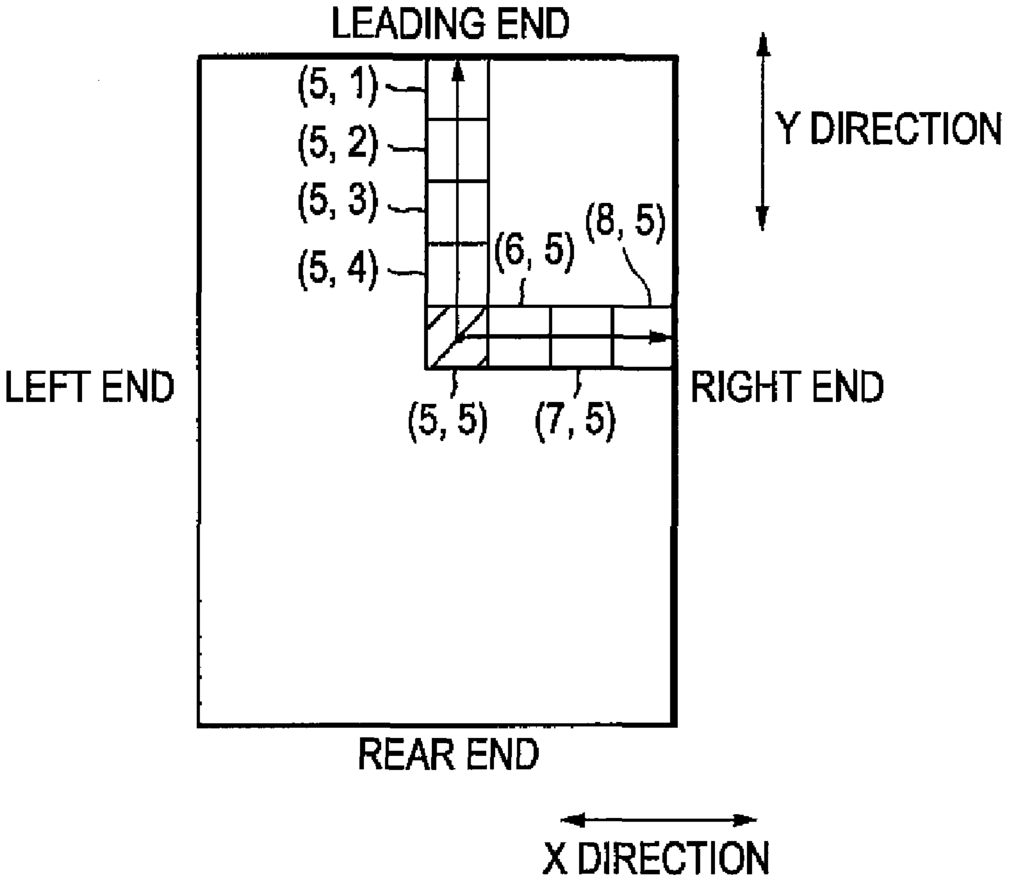
FIG. 17A is a view illustrating sections of grid existing between a target section of grid and an end portion of print paper.
Figure 17B:
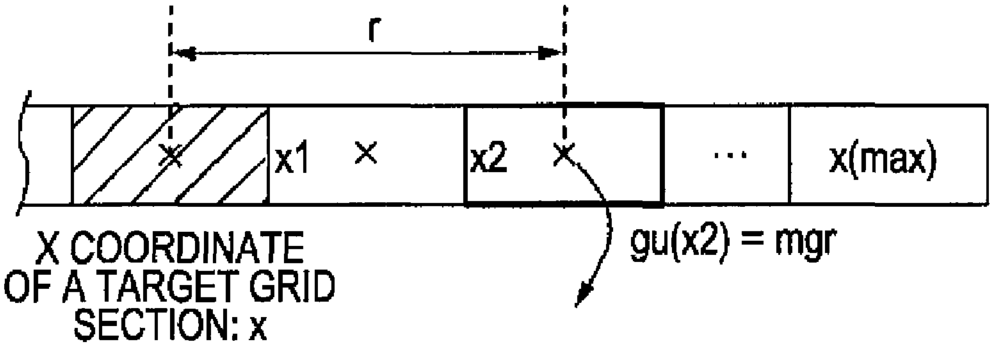
FIG. 17B is a view illustrating calculation of gravity moment of a single section of grid.

FIG. 17A shows sections positioned between the target section (hatched portion) and the paper end. FIG. 17B shows calculation of the gravity moment gu of a single section. First of all, in the state in which the target section is set to the center, moment force (hereinafter, unit gravity moment gu) of each of sections positioned between the target section and the paper end, which is generated by the weight of each of the sections, is calculated. Then, the unit gravity moments gu of sections positioned between the target section to the paper end are integrated to produce the gravity moment G. The paper has four ends, and there are two kinds of paper curls according to direction (lateral direction curl and longitudinal direction curl). Accordingly, for one target section, the gravity moment G(x) with respect to the lateral direction curl and the gravity moment G(y) with respect to the longitudinal direction curl are calculated. The gravity moment G(x) with respect to the lateral direction curl is an integrated value of the unit gravity moments gu(x) of sections positioned between an end portion (either a left end portion or a right end portion) of the paper which is nearer the target section and the target section and arranged in the X direction of the target section. The gravity moment G(y) with respect to the longitudinal direction curl is an integrated value of unit gravity moments gu(y) of sections positioned between the target section and an end portion (either an upper end portion or a lower end portion) of the paper which is nearer the target section and the target section and arranged in the Y direction of the target section.

Hereinafter, a calculation equation of the gravity moment G(x) of the lateral direction curl is shown. This is similar with a calculation equation of the gravity moment G(y) of the longitudinal direction curl. m is mass per section of grid (for example, 64 g/m$^2$), g is gravity acceleration (for example, 9.8 m/s$^2$), X is a coordinate of the position of the target section, Xmax is a coordinate of a section which is closest to the paper end, and r is distance between the target section and a section for calculating the unit gravity moment gu. The gravity moment G is a value when the paper is in the planar state, and the gravity moment G is a dimensionless value like the smoothed deflecting stress T.

$$G(x) = \sum_{r=1}^{xmax-x} (\mathrm{mg}) \cdot r$$

The unit gravity moment gu(x) of a single section is expressed by "gu(x)=mgr." FIG. 17B shows calculation of the unit gravity moment gu(x2) of the second section x2 from the target section on the right side of the target section. Since mass of the section x2 is m, gravity affecting the section x2 is g, and distance between the target section and the section x2 is r, the moment force (the unit gravity moment gu(x2)) by the section x2 when the target section is the center is mgr.

For example, a XY coordinate of the target section (hatched portion) shown in FIG. 17A is (5, 5). The target section is nearer the right end portion of the paper in the X direction than the left end portion of the paper. In this case, the gravity moment G(x) of the target section with respect to the lateral direction curl is an integrated value of unit gravity moments gu of three sections ((6, 5), (7, 5), and (8, 5)) positioned between the target section and the right end portion of the paper. The target section is nearer the front end portion of the paper in the Y direction than the back end portion of the paper. In this case, the gravity moment G(y) of the target section with respect to the longitudinal direction curl is an integrated value of unit gravity moments gu of four sections ((5, 1), (5, 2), (5, 3), and (5, 4)) positioned between the target section and the front end portion of the paper.

Figure 18A:
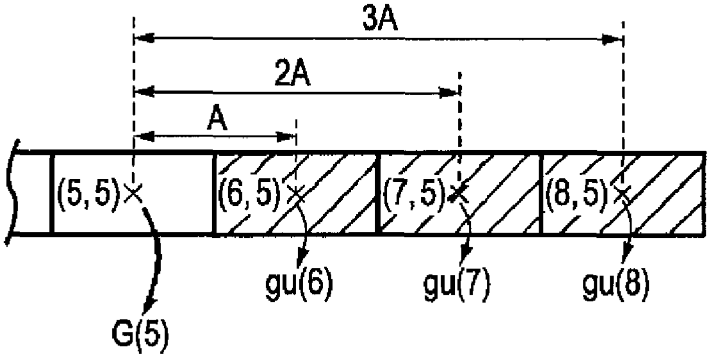
FIGS. 18A, 18B, and 18C are views illustrating calculation of gravity moment for a lateral direction curl.

FIG. 18A shows calculation of the gravity moment G(5) of the section (5, 5) with respect to the lateral direction curl. The gravity moment G(5) of the target section (5, 5) is an integrated value of a unit gravity moment gu(6) of the section (6, 5), a unit gravity moment gu(7) of the section (7, 5), and a unit gravity moment gu(8) of the section (8, 5). A length of the section in the lateral direction is defined as A, and an interval between adjacent sections is also defined as A. As a result, the gravity moment G(5) is expressed by the following equation.

$$G(x)=G(5)=gu(6)+gu(7)+gu(8)=\mathrm{mgA}+2\ \mathrm{mgA}+3\ \mathrm{mgA}=6\ \mathrm{mgA}.$$

Figure 18B:
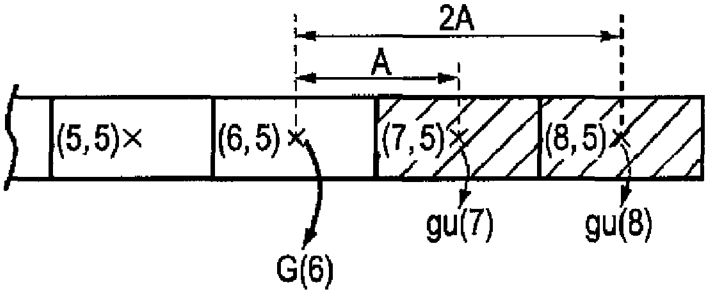
Figure 18C:
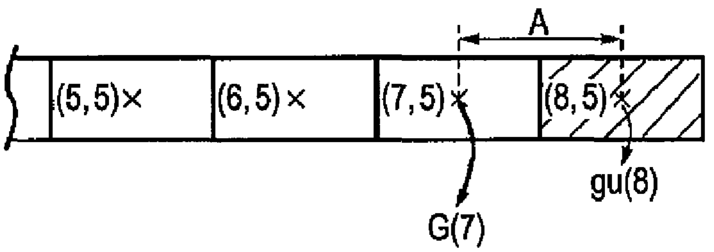

FIG. 18B shows calculation of the gravity moment G(6) of the section (6, 5) with respect to the lateral direction curl, and FIG. 18C shows calculation of the gravity moment G(5) of the section (7, 5) with respect to the lateral direction curl.

In the similar manner, the gravity moment G(6) of the section (6, 5) and the gravity moment G(7) of the section (7, 5) are expressed by the following equation.

$$G(x)=G(6)=gu(7)+gu(8)=\mathrm{mgA}+2\ \mathrm{mgA}=3\ \mathrm{mgA}.$$

$$G(x)=G(7)=gu(8)=\mathrm{mgA}.$$

From the result of the above, as the section is nearer the center portion of the paper, the gravity moment of such a section becomes larger. That is, the gravity moment (for example, G(5)=6 mgA) of the section near the center portion of the paper is larger than the gravity moment (for example, G(7)=mgA) of the section near the paper end portion. Accordingly, as the section is nearer the center portion of the paper, it becomes harder for the paper curl to occur since the smoothed deflecting stress T beats the gravity moment G. That is, it is possible to reproduce the phenomenon in which the section is nearer the center of the paper, it becomes harder for the paper curl to occur, compared to the end portion of the paper, and thus it is possible to more precisely predict generation of the curl.

In this manner, after the gravity moment G(x) of each of the sections with respect to the lateral direction curl and the gravity moment G(y) of each of the sections with respect to the longitudinal direction curl are calculated, a next step progresses Further, in the section positioned at the center portion of the paper, in the case in which distances from the center of the section to the left and right end portions of the paper (or to the front and back end portions of the paper) are equal to each other, an integrated value of the unit gravity moments gu of sections positioned between the section of the center portion of the paper and any one end portion of the paper is defined as the gravity moment.

S25: Calculation of a Curl Amount for Each Grid Section

The curl state prediction module calculates the deflecting stresses t(x), t(y) with respect to the lateral direction curl and the longitudinal direction curl on the basis of the ink amounts i hit to the sections, respectively, and then the smoothed deflecting stresses T(x), T(y) in which deflecting stresses of surrounding sections are considered are calculated. Further, the gravity moments G(x), G(y) for each of sections with respect to the lateral direction curl and the longitudinal direction curl are calculated. A curl angle θ and a curl amount Z for each of sections (in which the curl angle θ and curl amount Z correspond to a curl amount) are calculated on the basis of these values.

Figure 19A:
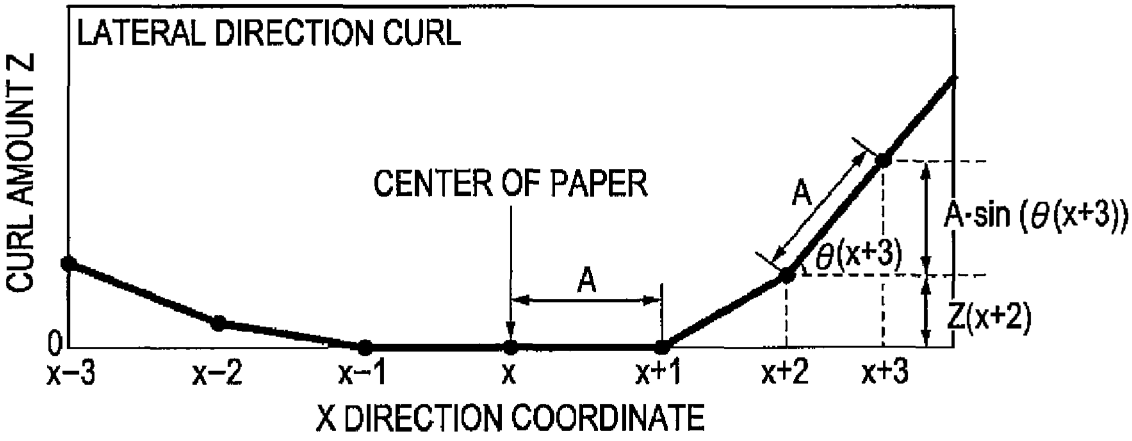
FIG. 19A is a view illustrating a curl angle and a curl amount.
Figure 19B:
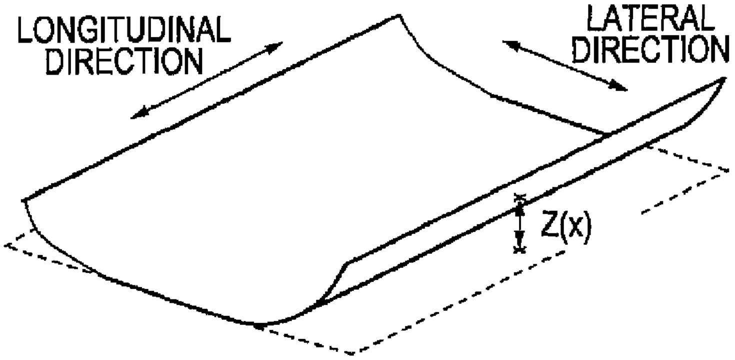
FIG. 19B is a perspective view illustrating a curl amount.

FIG. 19A shows the curl angle θ(x) and the curl amount Z(x) for each of sections with respect to the lateral direction curl. FIG. 19B is a perspective view illustrating the curl amount Z(x). The smoothed deflecting stress T is a force of causing the paper to curl, and the gravity moment is a fore of inhibiting the paper to curl. Accordingly, the curl angle θ of the paper is calculated from the difference between the smoothed deflecting stress T and the gravity moment G. When a coordinate of the target section is (x, y), the curl angle θ(x) with respect to the lateral direction curl is shown by the following equation. Further, the curl angle θ(y) with respect to the longitudinal direction curl is also expressed by the similar equation. α is a conversion coefficient which converts a force of difference between the smoothed deflecting stress T(x) and the gravity moment G(x) to the curl angle θ(x), and can be empirically (experimentally) calculated.

$$\theta(x)=\theta(x-1)+(T(x)-G(x))\cdot\alpha$$

With this embodiment, only the curl in which the print surface becomes the inside surface is considered, when "T(x)−G(x)" is a minus value for such a reason that the ink hit amount is small and therefore the smoothed deflecting stress T(x) is small, or that the section is near the center portion of the paper and therefore the gravity moment G(x) is large, the curl angle θ(x) is zero and the paper does not curl. The curl angle θ(x−1) means a curl angle of the section (x−1) adjacent to the target section (x) and closer to the center of the paper than the target section (x).

Further, it is possible to calculate the curl amount Z(x) after the curl angle θ(x) for each of sections is calculated. The curl amount Z(x) is a length in the vertical direction with respect to the horizontal plane which is the surface of the paper. Calculation of the curl amount Z(x) of the lateral direction curl is shown below. "A" is a length of the section in the X direction. The curl amount Z(y) of the longitudinal direction curl can be calculated in the similar manner. Z(x−1) is a curl amount of the section (x−1) adjacent to the target section (x) and closer to the center of the paper than the target section (x).

$$Z(x)=Z(x-1)+A\cdot\sin\theta(x).$$

The nearer the center portion of the paper, the easier the paper curls compared to the end portion of the paper. The paper curl continuously occurs. Accordingly, with this embodiment, integration of the curl angle θ and the curl amount Z of each of the sections of the paper progresses from the section at the center of the paper toward the four ends (left and right ends, front and back ends) of the paper when the center portion of the paper is the reference position. Accordingly, in the calculation equation of the curl angle θ(x), the curl angle θ(x) attributable to the force that the target section tries to curl is added to the curl angle θ(x−1) of the section adjacent to the target section and closer to the center of the paper than the target section. In the similar manner, in the calculation equation of the curl amount Z(x), the curl amount Z(x) attributable to the force that the target section tries to curl is added to the curl amount Z(x−1) of the section adjacent to the target section and closer to the center portion of the paper than the target section.

In greater detail, the curl amount Z and the curl angle θ of the section corresponding to the center portion of the paper in order to set the center of the paper to the reference position are set to zero (predetermined value), and the integration of the curl amount and the curl angle of the section progresses in order from the center portion of the paper toward each end of the paper. In the case of the lateral direction curl, the section adjacent to the center portion of the paper in the lateral direction is set to the reference position, and the curl amounts or curl angles of the sections arranged in the lateral direction of the section of the center portion are integrated toward the left end or the right end of the paper. In FIG. 19A, the curl angle θ(x+1) of the section (x+1) which is the right-side neighboring section of the section disposed at the center is zero, and the curl amount Z(x+1) of the section (x+1) is zero. Accordingly, in the section (x+3) which is farther on the right side than the section (x+1), the curl at the curl angle θ(x+3) is generated. The curl amount Z(x+3) of the section (x+3) is a length of the sum of the curl amount Z(x+2) of the section (x+2) and the curl amount A·sin(θ(x+3)) by the curl angle θ(x+3), and the section (x+3) curls by the amount Z(x+3) from the horizontal plane. In this manner, it is possible to predict at which position the paper curls and how much the paper curls at the position.

In the case of the longitudinal direction curl, the sections positioned at the center of the paper in the longitudinal direction are set to the reference positions, and the integration of the curl amounts of the sections arranged in the longitudinal direction of each of the sections at the center positions progresses in order toward the front end or the back end of the paper. An XY coordinate of the section shown when calculating the smoothed deflecting stress T(S23) is set to the reference position is determined, setting the left uppermost section to reference value (1, 1). In this case, when calculating the curl angles θ(x) or the curl amounts Z(x) of the sections on the left side or the upper side of the paper from the center portion of the paper, the curl angle θ(x+1) and the curl amount Z(x+1) of the section having a larger coordinate become the reference values.

Figure 19C:
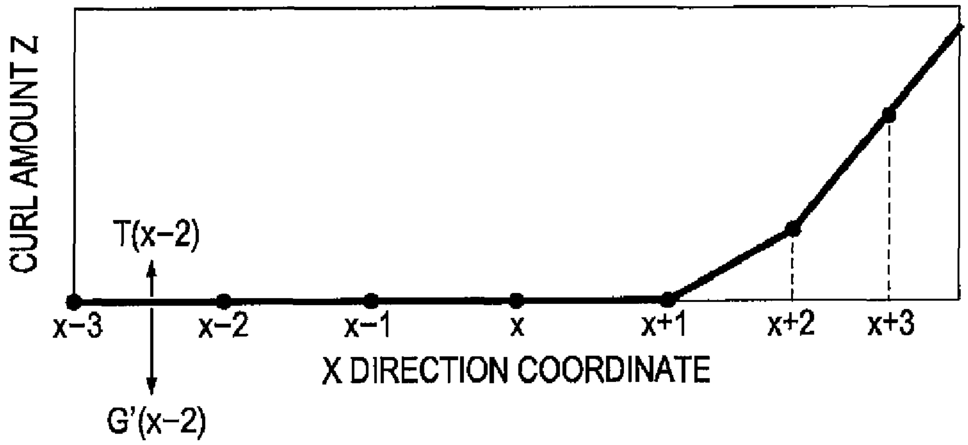
FIG. 19C is a view illustrating a curl angle and a curl amount according to a comparative example.

FIG. 19C shows a curl angle and a curl amount according a comparative example in which the left end portion of the paper is the reference position. With this example, the gravity moment G, the curl angle θ0, and the curl amount Z are calculated, setting the enter portion of the paper as the reference position in order to reproduce the phenomenon in which it is harder for the center portion of the paper to curl than the end portion of the paper. Supposed that these values G, θ, and Z are calculated, setting the left end portion of the paper as the reference position instead of setting the center portion of the paper as the reference position. Doing so, the gravity moment G'(x−2) of the section (for example, section (x−2)) on the more left side than the center portion of the paper becomes an integrated value of unit gravity moments gu(x) of sections positioned from the target section (x−2) to the right end portion of the paper. That is, the gravity moment G' of the left-side sections is larger than an integrated value of unit gravity moments gu of sections positioned on the right-side half of the paper, and actually considerably exceeds the force (gravity moment) of inhibiting the paper curl. As a result, the gravity moment G' comes to exceed the smoothed deflecting stress T, and thus, as shown in FIG. 19C, it is predicted such that no curl occurs at the sections on the left side of the paper. Accordingly, as in this embodiment, taking the phenomenon in which it is harder for the center portion of the paper to curl than the end portion of the paper into consideration, since the gravity moment G, the curl angle θ, and the curl amount Z are calculated, setting the center portion of the paper as the reference position, it is possible to more precisely predict the curl state of the paper.

Figure 19D:
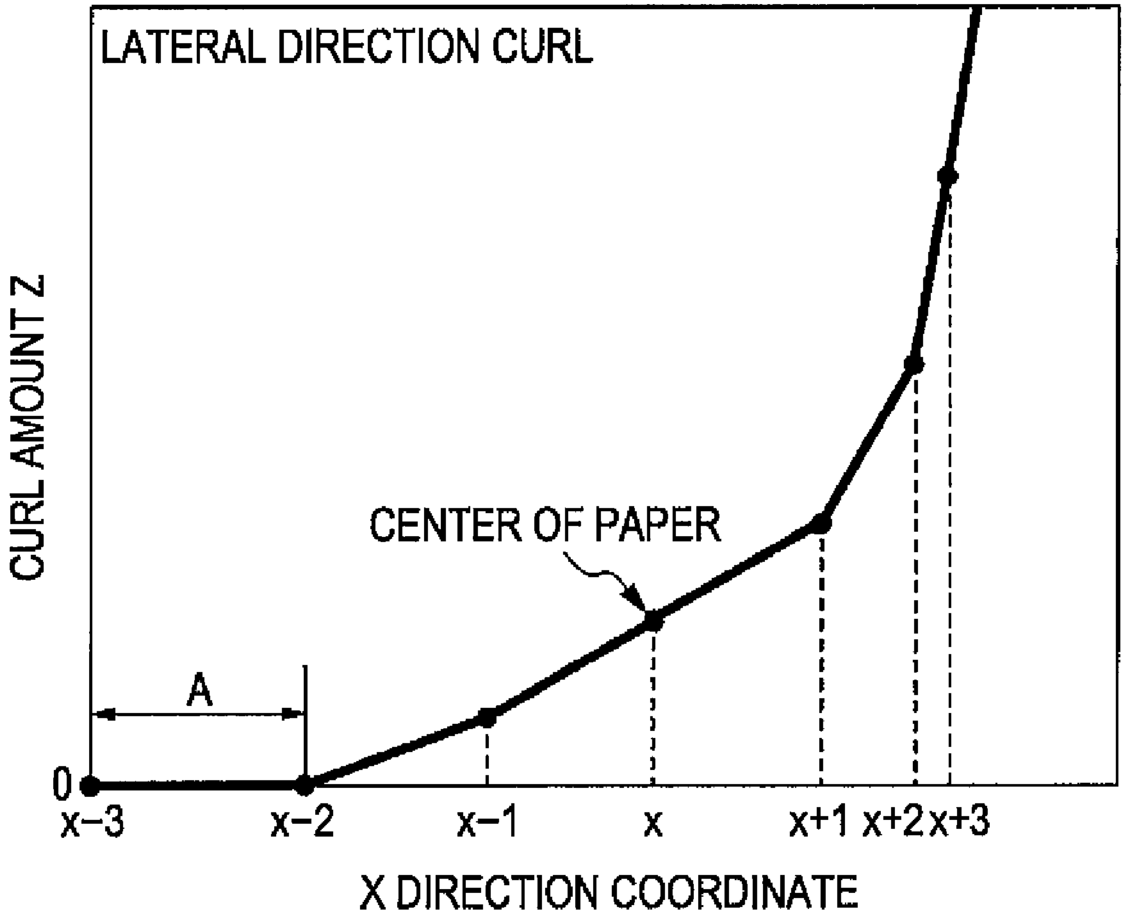
FIG. 19D is a view illustrating a curl angle and a curl amount according to another comparative example.

FIG. 19D is another comparative example and shows the curl angle θ and the curl amount Z when the left end portion of the paper is the reference position. In this comparative example, the gravity moment G is calculated, setting the center portion of the paper as the reference position, but the curl angle θ and the curl amount Z are calculated, setting the left end portion of the paper as the reference position. Accordingly, like the previously mentioned comparative example (FIG. 19C), the gravity moment G of sections on the left side of the paper becomes very larger than that of the center portion of the paper, and thus it is possible to prevent erroneous prediction such that no curl occurs at the section on the left side of the paper even in the case of causing the curl from occurring. However, if the curl angles θ and the curl amounts Z are integrated from the left end portion, an integrated value of the curl amounts of sections disposed from the left end portion to the center portion of the paper is predicted as the curl amount of the center portion of the paper. This contradicts the phenomenon in which it is relatively hard for the center portion of the paper to curl compared to the end portion of the paper. Further, since the curl amounts are integrated from the left end portion of the paper, the predicted curl amount is larger than the actual curl amount at the right end portion of the paper. Accordingly, when the curl amount predicted in the subsequent step is compared with a threshold value, even though the curl amount of the right end portion of the paper must not exceed the threshold value originally, the result that the predicted curl amount exceeds the threshold value comes out. As a result, there is a possibility that curl prevention measurement is unnecessarily performed. In conclusion, it is possible to more precisely predict the curl state of the paper by setting the center portion of the paper as the reference position when calculating the curl angle θ and the curl amount Z as well as when calculating the gravity moment G.

S26: Prediction of a Curl State of Paper

Finally, for each of the sections, the curl amount Z(x) with respect to the lateral direction curl and the curl amount Z(y) with respect to the longitudinal direction curl are compared, and then a larger value of the curl amounts Z(x) and Z(y) is adopted as the curl amount Z of the section.

Figure 20A:
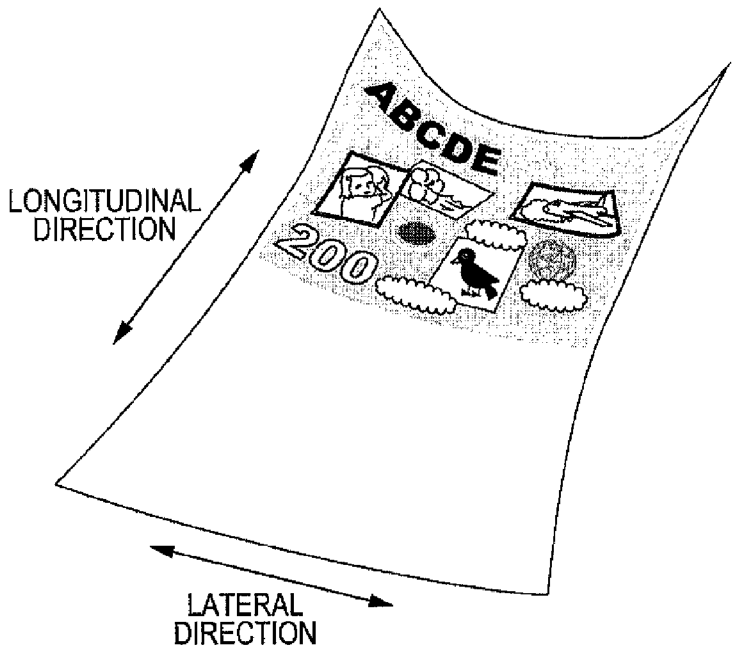
FIG. 20A is a view illustrating a form of a curl when an image is printed on an upper half of print paper in longitudinal direction.
Figure 20B:
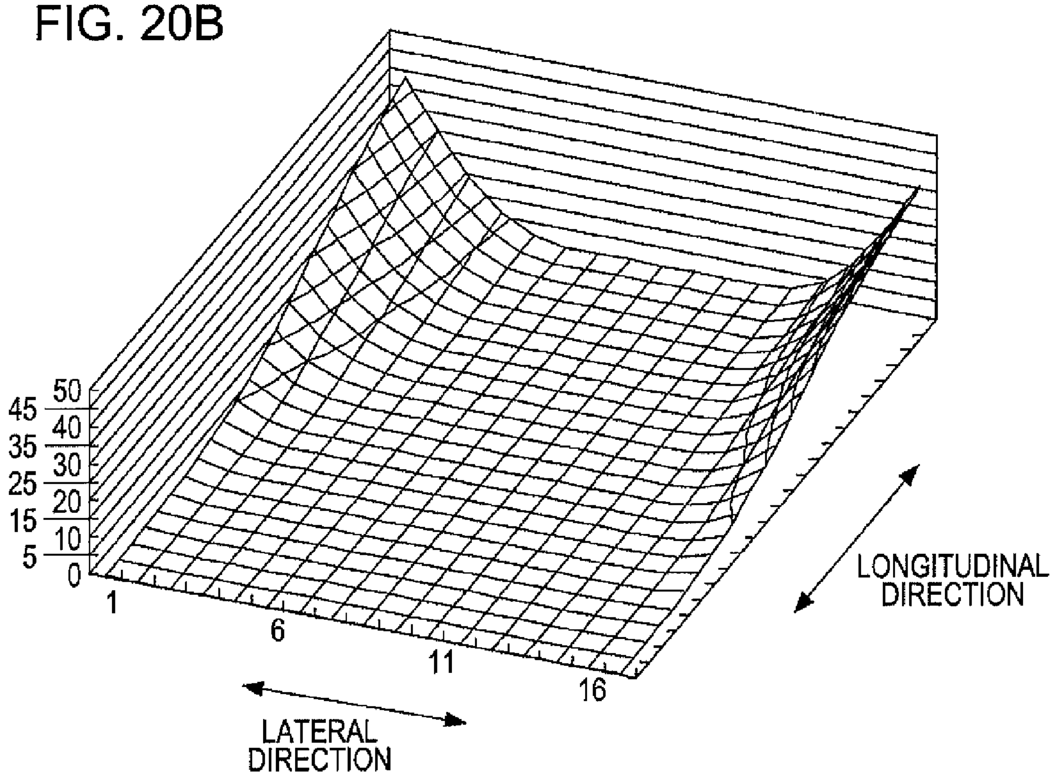
FIG. 20B is a graph illustrating a curl amount Z which is calculated.

FIG. 20A shows the curl state of the paper in which an upper half of the paper in the longitudinal direction is printed with an image (a photographed image), and FIG. 20B is a three-dimensional graph showing the curl amount Z calculated by the curl state prediction module. When the upper half of the paper is printed with the image in actual practice, the lateral direction curl occurs at the left upper portion and the right upper portion of the paper. The prediction result (FIG. 20B) of the curl state prediction module also shows that the lateral direction curl occurs at the left upper portion and the right upper portion of the paper. That is, it is possible to precisely predict the curl state (curl position and curl amount)

It is preferable that a threshold value is set with respect to the curl amount Z of the paper which is predicted by the curl state prediction module. Doing so, like the flow of FIG. 6, the data correction module 23*h* may judge whether the curl amount Z exceeds the threshold value. In the case in which the curl amount Z exceeds the threshold value, the data correction module 23*h* performs correction of ink hit amount, such as reduction of the ink hit amount so that the curl does not occur. Doing so, it is possible to prevent the paper curl from occurring.

Modification

Figure 21:
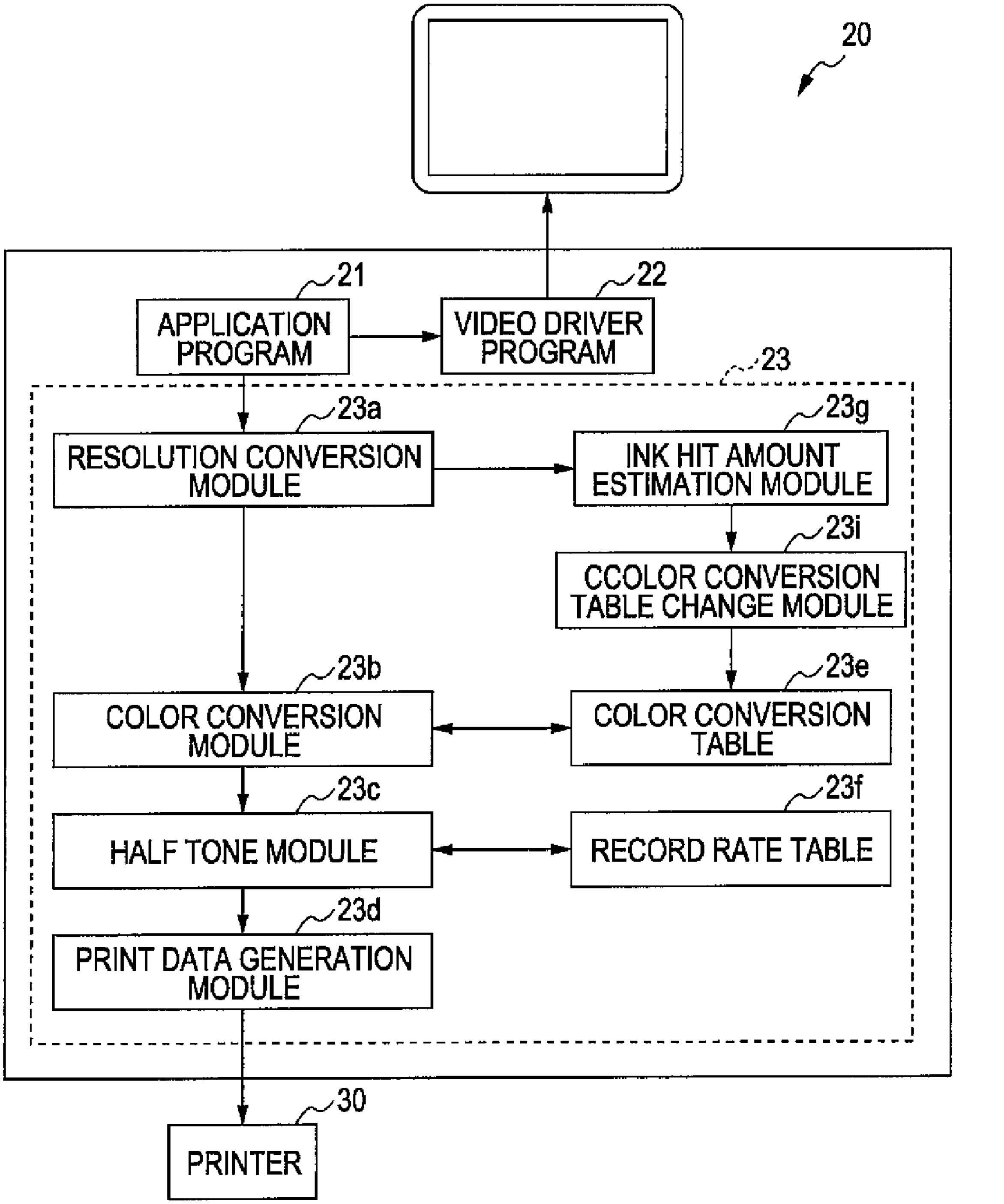
FIG. 21 is a view illustrating modification of a program stored in a computer.

Although one embodiment of the invention has been described so far, the invention may be modified in various forms. For example, the image processing device has functions of the programs and drivers shown in FIG. 21 instead of the programs and drivers shown in FIG. 2. In FIG. 21, the structure does not have the data correction module 23*h* of FIG. 2 but includes a color conversion table replacing module 23*i*. The color conversion table replacing module 23*i* replaces the color conversion table 23*e* on the basis of the ink hit amount estimated in the ink hit amount estimation module 23*g*. Further, a structure having a module (record rate table replacing module) for replacing the record rate table 23*f* but not having the color conversion table replacing module 23*i* may be adopted. Further, a structure having both of the color conversion table replacing module 23*i* and the record rate table replacing module may be adopted.

In the case of adopting such structures, the color conversion table 23*e* (and/or the record rate table 23*f*) before performing the half tone processing is replaced on the basis of the ink hit amount estimated in the ink hit amount estimation module 23*g*. Accordingly, as shown in FIG. 2, it is possible to simply perform correction (control) of the ink hit amount compared to the method of performing correction of the ink hit amount with respect to the bit map data by using the data correction module 23*h*. Further, it is possible to improve the processing speed compared to the method of using the data correction module 23*h*.

In the above described embodiment, the image processing device is realized by the computer 20. However, alternatively, a structure in which a function of the image processing device is realized in the printer 30 may be adopted. Further alternatively, a structure in which the function of the image processing device scatters across the computer 20 and the printer 30 may be adopted. The function of the image processing device may be realized by an external connectable device other than the computer 20 and the printer 30.

In the above described embodiment, the ink hit amount is estimated by the ink hit amount estimation module 23*g* after the resolution conversion processing is performed in the resolution conversion module 23*a*. However, the estimation of the ink hit amount may be performed by directly delivering the image data to the ink hit amount estimation module 23*g* from the application program 21.

Further, an ejection amount estimation unit in the claims and an ink hit amount estimation module 23*g* may be realized in hardware or in software. An image processing program (an image forming procedure and a drive data creation procedure in claims) having the function of the image processing device may be stored in, for example a compact disc (CD), a digital versatile disc (DVD), or various kinds of memories, and the above-mentioned processing may be executed by reading such an image processing program by the computer 20 and/or the printer 30.

In the above described embodiment, the printing device 10 equipped with the image processing device shown in FIG. 1 is explained, but the printing device may be other printing devices other than the printing device 10. For example, there may be a structure in which the entire image processing device exists in the computer 20, or a structure in which the entire image processing device exists in the printer 30. Further, as a further example in which functions of the image processing device is divided into the computer 20 and the printer 30, there may be a structure in which the flow up to the half tone processing is executed in the computer 20.

In the above described embodiment, the ink jet type printer 30 is exemplified. However, the printer is not limited to the ink jet printer 30 but be other types of printers as long as the printers can eject a fluid. The invention also can be applied to a gel jet type printer. Further, the printer 30 in the above embodiment may be part of a multifunctional machine having functions (scanner function, copier function, etc.) other than the printer function.

The entire disclosure of Japanese Patent Application No: 2008-079949, filed Mar. 26, 2008 and No: 2008-259334, filed Oct. 6, 2008 are expressly incorporated by reference herein.

What is claimed is:

1. An image processing device comprising:

an ejection amount estimation unit that estimates an ejection amount of the fluid from input image data, wherein the ejection amount estimation unit estimates the ejection amount of the fluid for each area specified on a medium to which the fluid is ejected, the image processing device further comprises a curl state prediction unit that predicts a curl state of the medium, a curl occurring as the fluid is ejected to the medium, based on a position of the area on the medium and the ejection amount of the fluid ejected to the area, and the curl state prediction unit converts a force of causing the medium to curl in a predetermined direction and a force of causing the medium to curl in a direction intersecting the predetermined direction so as to be different from each other when converting the ejection amount of the fluid for each area to a force of causing the medium to curl, and predicts a curl amount for each area based on the force of causing the medium to curl.

2. The image processing device according to claim 1, wherein an ejection amount conversion table is created on the basis of patch image data having predetermined data amount, the patch image data being based on an RGB color system, and wherein the ejection amount conversion table has data for a single pixel in the patch image data, and the data for a single pixel has an anticipated value relating to ejection of the fluid.

3. The image processing device according to claim 1, wherein the ejection amount estimation unit has a gradation reduction processing portion which performs processing of reducing a gradation number of the input image data.

4. The image processing device according to claim 3, wherein the input image data is expressed by an RGB color system and 256-level gradation, and wherein an ejection amount conversion table has a pixel value in a case in which data is expressed by the RGB color system and a lower gradation number than the data of the 256-level gradation and the anticipated value with respect to the pixel value.

5. The image processing device according to claim 4, wherein when the pixel value is expressed by a value of the 256-level gradation before the gradation reduction, a gradation difference in a case of the 256-level gradation before the gradation reduction is smaller at an area having a larger ejection amount of the fluid than at an area having a smaller ejection amount of the fluid.

6. The image processing device according to claim 1, wherein the ejection amount estimation unit has a resolution reduction processing portion which performs processing of reducing a number of pixels of the input image data, and wherein the resolution reduction processing portion reduces the number of pixels by extracting a gradation value of one pixel in a pixel group existing within a predetermined range as a representative pixel value.

7. The image processing device according to claim 1, wherein the ejection amount estimation unit has a resolution reduction processing portion which performs processing of reducing a number of pixels of the input image data, and wherein the resolution reduction processing portion reduces the number of pixels by calculating a representative pixel value representing a pixel group existing within a predetermined range, the representative pixel value being a gradation value of one pixel, on the basis of a predetermined conversion equation.

* * * * *